(12) United States Patent
Luccin et al.

(10) Patent No.: US 10,489,651 B2
(45) Date of Patent: Nov. 26, 2019

(54) IDENTIFYING A POSITION OF A MARKER IN AN ENVIRONMENT

(71) Applicant: Microsoft Technology Licensing, LLC, Redmond, WA (US)

(72) Inventors: Karim Audrey Luccin, Redmond, WA (US); Marcus Philip Ghaly, Kirkland, WA (US); Sergio Paolantonio, Bellevue, WA (US); Brian Zhian Bassir, Bothell, WA (US); Michael Jordon Felice, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 26 days.

(21) Appl. No.: 15/607,496

(22) Filed: May 28, 2017

(65) Prior Publication Data

US 2018/0300551 A1 Oct. 18, 2018

Related U.S. Application Data

(60) Provisional application No. 62/485,738, filed on Apr. 14, 2017.

(51) Int. Cl.
*G06K 9/00* (2006.01)
*G06T 19/00* (2011.01)
(Continued)

(52) U.S. Cl.
CPC ..... *G06K 9/00671* (2013.01); *G06K 9/00201* (2013.01); *G06K 9/2063* (2013.01);
(Continued)

(58) Field of Classification Search
None
See application file for complete search history.

(56) References Cited

U.S. PATENT DOCUMENTS 7,996,793 B2 8/2011 Latta et al.
9,280,852 B2 3/2016 Adhikari et al.
(Continued)

FOREIGN PATENT DOCUMENTS

EP 1103824 A2 5/2001
JP 2013109768 A 6/2013
(Continued)

OTHER PUBLICATIONS

Stengel, Michael, "Marker-based positional tracking," available at <<https://inmagicwetrust.wordpress.com/2015/11/05/markerbased-positional-tracking/>>, Wordpress.com, published on Nov. 5, 2015, 15 pages.
(Continued)

*Primary Examiner* — Motilewa Good Johnson
(74) *Attorney, Agent, or Firm* — Rainier Patents, P.S.

(57) ABSTRACT

A technique is described herein for determining the position of at least one previously-placed physical marker in a physical environment. In one approach, the technique detects the marker at plural vantage points in the environment, to yield plural instances of marker information. The technique then computes the position of the marker based on the plural instances of marker information collected at the plural vantage points. The technique may also provide a movement indicator that assists the user in moving to specified vantage points in the physical environment. The technique may use the identified position(s) of the marker(s) to accurately place virtual objects relative to real-world objects in a modified-reality world.

21 Claims, 13 Drawing Sheets

(51) Int. Cl.
   *G06K 9/18*   (2006.01)
   *H04N 5/232*  (2006.01)
   *G06T 7/73*   (2017.01)
   *G06K 9/20*   (2006.01)

(52) U.S. Cl.
   CPC .............. *G06T 7/73* (2017.01); *G06T 19/006* (2013.01); *H04N 5/23222* (2013.01); *H04N 5/23229* (2013.01); *H04N 5/23293* (2013.01); *G06K 9/00335* (2013.01); *G06K 9/18* (2013.01); *G06T 2200/24* (2013.01); *G06T 2207/10012* (2013.01)

(56) References Cited

U.S. PATENT DOCUMENTS

| | | | |
|---|---|---|---|
| 9,319,583 B2* | 4/2016 | Moon | H04N 9/8233 |
| 9,892,516 B2* | 2/2018 | Moteki | G06T 7/73 |
| 9,990,773 B2* | 6/2018 | Koga | G06T 19/006 |
| 10,078,914 B2* | 9/2018 | Koga | G06T 19/006 |
| 10,147,192 B2* | 12/2018 | Moteki | G06T 7/73 |
| 10,147,398 B2* | 12/2018 | Koga | G09G 5/377 |
| 10,186,084 B2* | 1/2019 | Tawara | G06K 9/3216 |
| 2003/0080978 A1* | 5/2003 | Navab | G01S 5/16 |
| | | | 345/633 |
| 2004/0113885 A1 | 6/2004 | Genc et al. | |
| 2009/0268052 A1* | 10/2009 | Takahashi | G06T 11/001 |
| | | | 348/223.1 |
| 2011/0109617 A1 | 5/2011 | Snook et al. | |
| 2011/0214082 A1 | 9/2011 | Osterhout et al. | |
| 2012/0075343 A1 | 3/2012 | Chen et al. | |
| 2012/0120113 A1* | 5/2012 | Hueso | G06T 19/006 |
| | | | 345/672 |
| 2013/0106852 A1 | 5/2013 | Woodhouse et al. | |
| 2013/0148851 A1 | 6/2013 | Leung et al. | |
| 2014/0098128 A1* | 4/2014 | Fein | G06F 3/011 |
| | | | 345/633 |
| 2014/0280180 A1* | 9/2014 | Edecker | G06F 17/30867 |
| | | | 707/740 |
| 2014/0368533 A1 | 12/2014 | Salter et al. | |
| 2014/0375789 A1 | 12/2014 | Lou et al. | |
| 2015/0005084 A1 | 1/2015 | Tawwater et al. | |
| 2015/0145985 A1 | 5/2015 | Gourlay et al. | |
| 2015/0228114 A1 | 8/2015 | Shapira et al. | |
| 2015/0302650 A1 | 10/2015 | Abdelmoati et al. | |
| 2015/0317832 A1 | 11/2015 | Ebstyne et al. | |
| 2016/0027217 A1 | 1/2016 | da Veiga et al. | |
| 2016/0110917 A1 | 4/2016 | Iverson et al. | |
| 2016/0300354 A1* | 10/2016 | Fetzer | G06K 9/00664 |
| 2016/0307367 A1 | 10/2016 | Chuang et al. | |
| 2016/0364907 A1 | 12/2016 | Schoenberg | |
| 2017/0004649 A1 | 1/2017 | Romea et al. | |
| 2017/0011555 A1* | 1/2017 | Li | G06T 1/60 |
| 2017/0199916 A1* | 7/2017 | Loomans | G06F 17/30864 |
| 2017/0249745 A1* | 8/2017 | Fiala | G06K 9/00671 |
| 2017/0374280 A1* | 12/2017 | Chan | H04N 5/23222 |
| 2018/0046874 A1* | 2/2018 | Guo | G06K 9/3208 |
| 2018/0103209 A1* | 4/2018 | Fischler | G06F 3/04815 |
| 2018/0218538 A1* | 8/2018 | Short | G06T 19/006 |
| 2018/0276463 A1* | 9/2018 | Pritz | G06K 9/00577 |

FOREIGN PATENT DOCUMENTS

| | | |
|---|---|---|
| WO | 2014114907 A2 | 7/2014 |
| WO | 2015048890 A1 | 4/2015 |
| WO | 2016078919 A1 | 5/2016 |
| WO | 2016089357 A1 | 6/2016 |

OTHER PUBLICATIONS

Durrant-Whyte, et al., "Simultaneous Localisation and Mapping (SLAM): Part I The Essential Algorithms," in IEEE Robotics & Automation Magazine, vol. 13, No. 2, Jul. 2006, 9 pages.

Bailey, et al., "Simultaneous Localization and Mapping (SLAM): Part II," in IEEE Robotics & Automation Magazine, vol. 13, No. 3, Sep. 2006, 10 pages.

Keller, et al., "Real-time 3D Reconstruction in Dynamic Scenes using Point-based Fusion," in Proceedings of the 2013 International Conference on 3D Vision, 2013, 8 pages.

Izadi, et al., "KinectFusion: Real-time 3D Reconstruction and Interaction Using a Moving Depth Camera," in Proceedings of the 24th Annual ACM Symposium on User Interface Software and Technology, Oct. 2011, 10 pages.

Chen, et al., "Scalable Real-time Volumetric Surface Reconstruction," in ACM Transactions on Graphics (TOG), vol. 32, Issue 4, Jul. 2013, 10 pages.

"International Search Report and Written Opinion Issued In PCT Patent Application No. PCT/US18/026156", dated Jul. 9, 2018, 12 Pages.

Hartl, et al, "Mobile User Interfaces for Efficient Verification of Holograms", In Virtual Reality (VR), Mar. 23, 2015 pp. 119-126.

* cited by examiner

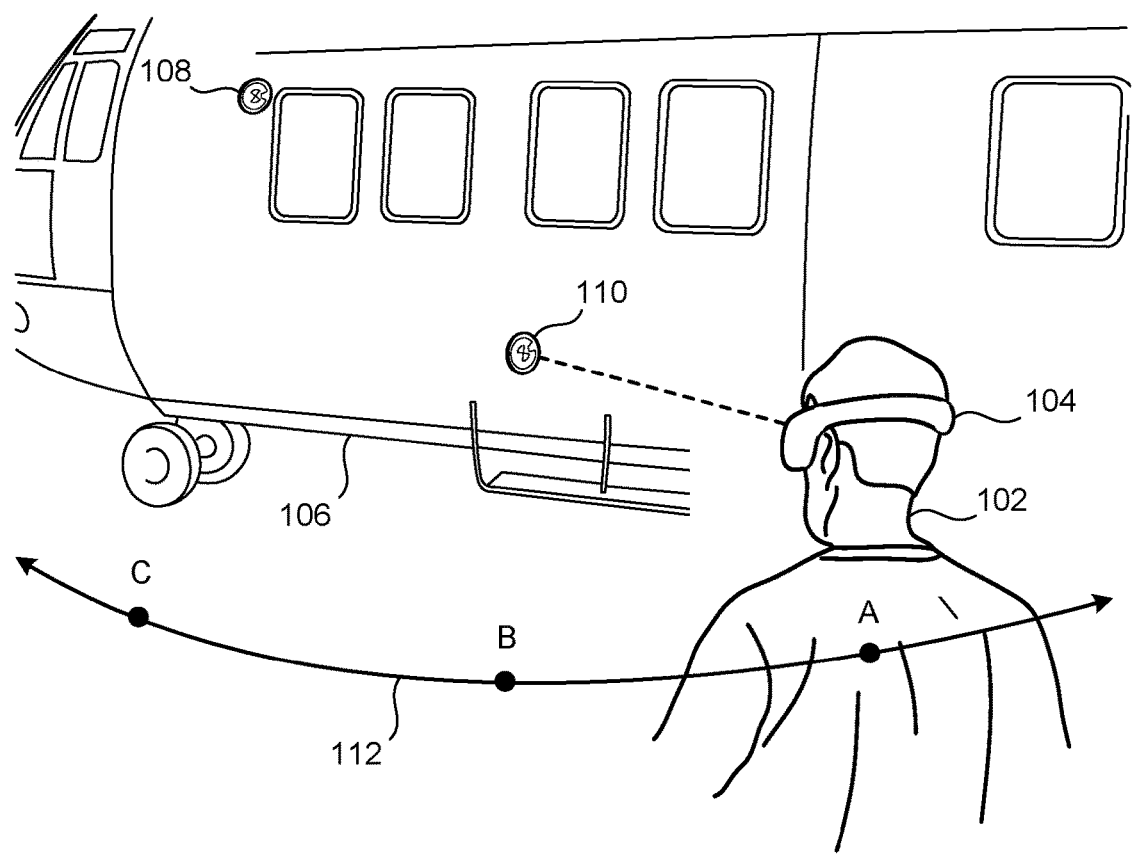
FIG. 1
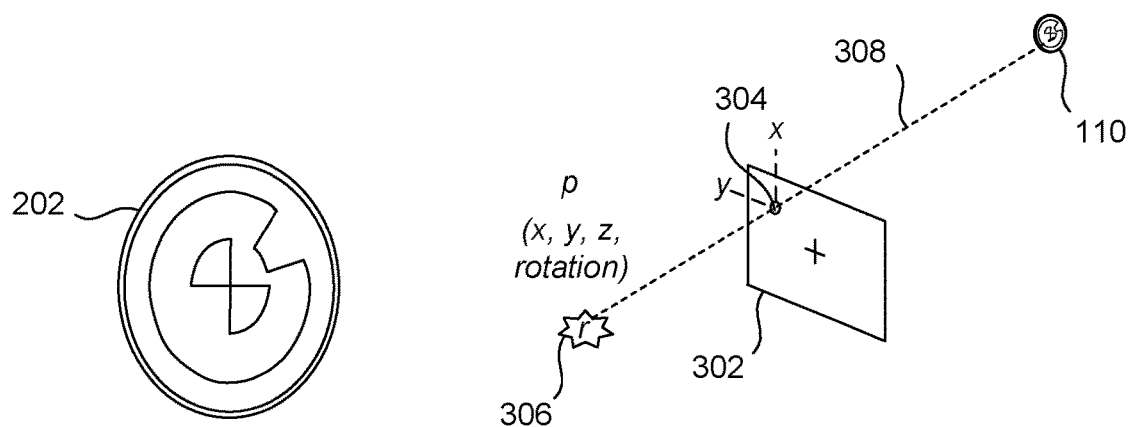
FIG. 2
FIG. 3

PROJECT A PLURALITY OF RAYS INTO THE ENVIRONMENT, EACH RAY BEING BASED ON: A POSITION OF AN INSTANCE OF MARKER INFORMATION IN A CORRESPONDING INSTANCE OF IMAGE INFORMATION; AND A PLACEMENT OF THE IMAGE CAPTURE DEVICE(S) IN THE ENVIRONMENT WHILE AT A PARTICULAR VANTAGE POINT IN THE ENVIRONMENT
1704

↓

IDENTIFY INTERSECTION INFORMATION THAT DESCRIBES A MANNER IN WHICH THE PLURALITY OF RAYS INTERSECT
1706

↓

DETERMINE THE POSITION OF THE MARKER BASED ON THE INTERSECTION INFORMATION
1708

IDENTIFYING A POSITION OF A MARKER IN AN ENVIRONMENT

This application claims the benefit of U.S. Provisional Application No. 62/485,738 (the '738 Application), filed on Apr. 14, 2017. The '738 Application is incorporated by reference herein in its entirety

BACKGROUND

A head-mounted display (HMD) or a like device produces a modified-reality environment by combining virtual objects and representations of real-world objects. The HMD will deliver poor user experience whenever it places the virtual objects at erroneous or otherwise non-ideal locations in the modified-reality environment. Indeed, for some modified-reality applications, the errant placement of virtual objects can significantly degrade the utility of the HMD, and may even lead to safety-related concerns.

SUMMARY

A technique is described herein for determining the position of at least one previously-placed physical marker in a physical environment. In one approach, the technique detects the marker at plural vantage points in the environment, to yield plural instances of marker information. The technique then computes the position of the marker based on the plural instances of marker information collected at the plural vantage points.

According to another illustrative aspect, the technique may use the identified position(s) of the marker(s) to accurately place virtual objects relative to real-world objects in a modified-reality environment.

According to another illustrative aspect, the technique may provide a movement indicator that assists the user in moving to specified vantage points in the physical environment.

According to another illustrative aspect, the technique may provide a progress indicator that identifies its progress in processing an instance of marker information within a particular instance of image information.

According to another illustrative aspect, the technique virtually projects plural rays into the modified-reality environment based on the plural respective instances of marker information. The technique determines intersection information based on the manner in which the plural rays intersect. The technique then leverages the intersection information to determine the position of the marker.

The above technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 1 shows an overview of one manner of use of a computing device (such as a head-mounted display) that provides a modified-reality experience. The modified-reality experience involves an operation of detecting physical markers that have been placed in a physical environment.

FIG. 2 shows one kind of representative marker.

FIG. 3 shows an instance of image information that depicts a marker placed in a physical environment.

FIG. 17 shows a process that describes one way of determining the position of a marker based on plural instances of marker information (collected per the process of FIG. 16).

Figure 4:
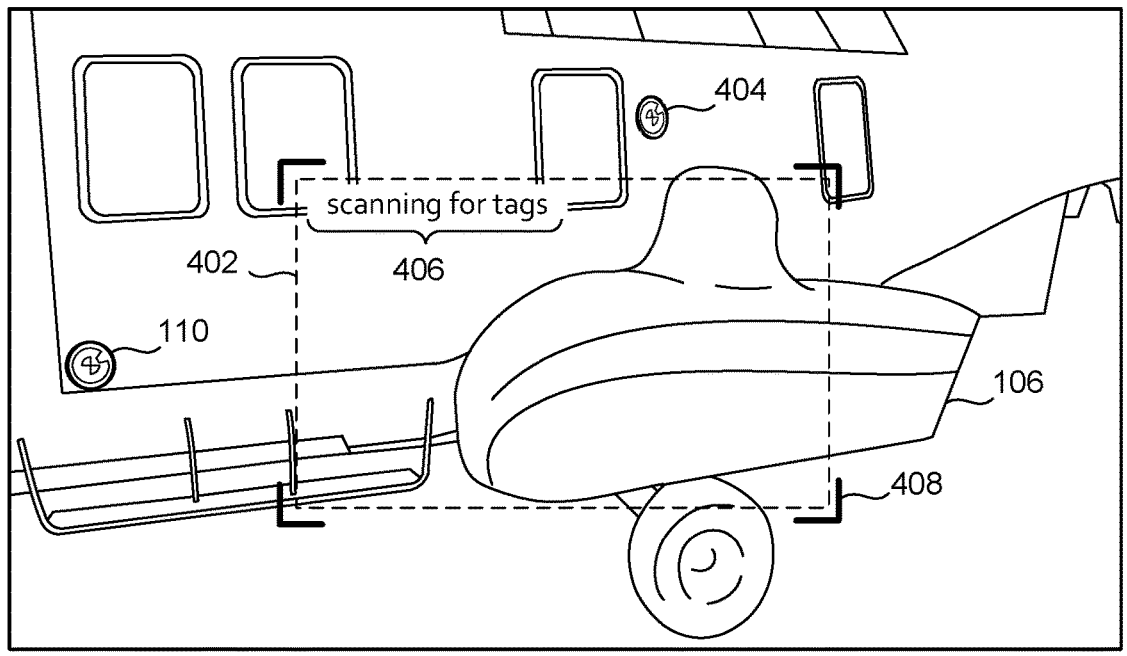
FIGS. 4-9 show representative presentations provided by the computing device (of FIG. 1) in the course of determining the position of a single marker.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes the operation of a computing device (such as a head-mounted display) that allows a user to robustly determine the positions of markers in a physical environment, for ultimate use in placing virtual objects in a modified-reality environment. Section B describes one implementation of the computing device. Section C describes the operation of the computing device of Section B in flowchart form. And Section D describes illustrative computing functionality that can be used to implement any aspect of the features described in the preceding sections.

As a preliminary matter, some of the figures describe concepts in the context of one or more structural components, also referred to as functionality, modules, features, elements, etc. In one implementation, the various components shown in the figures can be implemented by software running on computer equipment, or other logic hardware (e.g., FPGAs), etc., or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. Section D provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts can be implemented by software running on computer equipment, or other logic hardware (e.g., FPGAs), etc., or any combination thereof.

As to terminology, the phrase "configured to" encompasses various physical and tangible mechanisms for performing an identified operation. The mechanisms can be configured to perform an operation using, for instance, software running on computer equipment, or other logic hardware (e.g., FPGAs), etc., or any combination thereof.

The term "logic" encompasses various physical and tangible mechanisms for performing a task. For instance, each operation illustrated in the flowcharts corresponds to a logic component for performing that operation. An operation can be performed using, for instance, software running on computer equipment, or other logic hardware (e.g., FPGAs), etc., or any combination thereof. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific terms "computer-readable storage medium" and "computer-readable storage medium device" expressly exclude propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative Use Scenarios

FIG. 1 shows a scenario in which a user 102 uses a head-mounted display (HMD) 104 to interact with a physical environment. The HMD 104 provides a modified-reality environment that combines representations of real-world objects in the physical environment with virtual objects. As used herein, the term "modified-reality" environment is intended to encompass what is commonly referred to in the art as "augmented-reality" environments, "mixed-reality" environments, etc.

In one case, the HMD 104 can produce a modified-reality presentation by projecting virtual objects onto a partially-transparent display device. Through this process, the HMD 104 creates the illusion that the virtual objects are integrated with the physical environment, which the user 102 views through the partially-transparent display device. Alternatively, or in addition, the HMD 104 creates an electronic representation of real-world objects in the physical environment. For instance, the HMD 104 can produce an electronic version of the real-world objects by capturing an image of the physical environment and/or by producing information that describes the surfaces in the physical environment. The HMD 104 then integrates the virtual objects with the electronic version of the real-world objects, to produce the modified-reality presentation. The HMD 104 may project that modified-reality environment on an opaque display device or a partially-transparent display device. In summary, what is referred to herein as a "representation" of the physical environment may correspond to any of: the direction reception of the physical environment through a partially-transparent display device; an image of the physical environment; a computer-generated modeling of the physical environment, etc., or any combination thereof. Sections B and D provide further illustrative information regarding one implementation of the HMD 104.

In yet other cases, the user 102 may produce a modified-reality environment using some other type of computing device, besides the HMD 104, or in addition to the HMD 104, such as a handheld computing device. In one such implementation, a handheld computing device includes one or more cameras having apertures disposed on a first side, and a display device having a display surface disposed on a second side, wherein the first and second sides are opposing sides. In operation, the user 102 may orient the handheld computing device such that its camera(s) capture image information that describes the physical environment. The handheld computing device can add one or more virtual objects to the image information to produce a modified-reality presentation. The handheld computing device presents the modified-reality presentation on its display device. To nevertheless facilitate explanation, assume in the following examples that the computing device that produces the modified-reality environment corresponds to the HMD 104 shown in FIG. 1 and described more fully in Sections B and D.

The physical environment shown in FIG. 1 includes physical markers dispersed throughout. For example, the physical environment shown in FIG. 1 includes an aircraft 106 with which the user 102 seeks to interact. The aircraft 106 includes a plurality of physical markers (such as marker 108 and 110) affixed to its body. Although not shown, the aircraft 106 can also include physical markers affixed to interior surfaces of the aircraft 106. A marker corresponds to a physical element having a visually-detectable pattern that maps to a marker-specific code. As such, the marker 108 maps to a first marker-specific code, and the marker 110 maps to a second marker-specific code.

By way of overview, the user 102 uses the HMD 104 to detect the positions of one or more markers in the physical environment. The HMD 104 uses the positions of the markers to identify the position of the aircraft 106 relative to the user 102 with a high degree of precision, e.g., by using triangulation. The HMD 104 may thereafter leverage the identified position of the aircraft 106 relative to the user 102 to place virtual objects in relation to the aircraft 106. For example, the HMD 104 may determine (using a gaze detection engine) that the user 102 is currently gazing at a particular sensor within a compartment of the aircraft 106 that is tightly packed with many other sensors. In response, the HMD 104 can present an audio-visual guide pertaining to the targeted sensor, e.g., adjacent to that sensor. The user 102 may consult the guide in servicing the sensor. Because the HMD 104 knows the position of the aircraft 106 (relative to the user 102) with a high degree of confidence, it can place virtual objects in the modified-reality world with a high degree of precision.

Further note that the HMD 104 places virtual objects based on the location of the aircraft 106 relative to the user 102. Hence, the HMD 104 can perform its service regardless of the placement of the aircraft 106 in the physical environment 106. For instance, the HMD 104 can perform its service regardless of the type of hanger that houses the aircraft 106, and regardless of the placement of the aircraft 106 within a particular hanger. In other use scenarios, however, markers may be, alternatively, or in addition, placed on stationary objects in a physical environment. For instance, markers may be placed adjacent to doors in a building.

FIG. 1 summarizes the user's engagement with a representative marker 110. The HMD 104 uses one or more video cameras to receive image information as the user 102 views a portion of the physical environment. More specifically, at any given time, the HMD 104 receives a frame of image information from the video camera(s) that captures the user's current field of view. For instance, at a particular time, the HMD 104 may receive a frame of image information that indicates that the user 102 is looking at the midsection of the aircraft 106. The HMD 104 processes each frame (or each $n^{th}$ frame) of image information to determine whether it contains marker information that is indicative of the presence of a physical marker in the user's field of view. Assume, in the example of FIG. 1, that the user's current field of view encompasses the physical marker 110.

In some implementations, the HMD 104 may process a frame of image information in a multi-step process that, once initiated, takes a finite amount of time to perform. For instance, in one illustrative implementation, the HMD 104 may begin by first determining whether the image information contains characteristics that are indicative of the possible presence of marker information. For example, the HMD 104 may determine whether the image information contains a group of pixels having a color that corresponds to the color of the marker. The HMD 104 may then compare the identified group of pixels against a pattern associated with the marker. That is, the pattern describes the visual characteristics of the marker. If this test is passed, the HMD 104 may conclude that the image information contains marker information associated with a physical marker. Next, the HMD 104 can further analyze the marker information to determine the code conveyed by its pattern. This series of operations is described in the spirit of illustration, not limitation; other implementations can detect marker information using a different series of operations The marker information has a position within the image information defined by x, y coordinates. The HMD 104 also captures the image information at a prescribed position p. The position p refers to the location of the HMD 104 with respect to a world coordinate system, with respect to a device-specific reference point r associated with the HMD 104, such as a center point associated with the HMD 104. In other words, as used in this description, the reference point r refers to some location on the HMD 104, whereas the position p refers to where that reference point r lies relative to a world coordinate system. That is, the reference point r refers to a location relative to the HMD 104 itself, whereas the position p refers to where that reference point r lies (and how the HMD 104 is oriented) in an overall setting. The video camera(s) have a fixed positional relationship with respect to the reference point r. Hence, the position p of the HMD 104 also establishes the position of the video camera(s), which are attached to the HMD 104. The HMD 104 can capture the position p in six degrees of freedom. The HMD 104 stores the raw marker information, its x, y position, the HMD position p, and the code associated with the marker 110 in a data store.

In some implementation, the HMD 104 can repeat the above-described operations over plural frames to increase the confidence at which it detects the marker information. The HMD 104 can then determine and store a final x, y position of the marker information that represents the average of the x, y positions collected over plural frames. The HMD 104 can also determine and store a final position p of the HMD 104 that represents the average of the p positions collected over plural frames. Hence, any reference to an "instance" of image information herein can refer to a sample of image information that includes a single frame or plural frames. Likewise, any reference to an "instance" of marker information can refer to a sample of marker information extracted from a single frame or plural frames.

At the successful completion of its processing, the HMD 104 can provide a movement indicator that instructs the user 102 to move to one or more other vantage points in the physical environment. For example, assume that the user 102 first views the physical marker at vantage point A within the physical environment. The HMD 104 may provide a movement indicator that instructs the user 102 to also move to vantage points B and C. In one implementation, the vantage points A, B and C lie along an arc 112. Section B will provide further details regarding one way in which the HMD 104 can determine the path of the arc 112 and points along the arc 112.

The HMD 104 then detects when the user 102 has moved to the vantage point B or C. In response to this determination, the HMD 104 detects the marker 110 at the new vantage point using the same process described above. At the termination of this process, the HMD 104 may instruct the user 102 to move to yet another vantage point. For example, after detecting the marker 110 at vantage point B, the movement indicator may instruct the user 102 to move to vantage point C, etc. At any given time, the user 102 movement indicator can also provide information that informs the user 102 as to the vantage point(s) at which the marker 110 has already been successfully detected.

The HMD 104 determines a final position associated with the marker 110 based on the instances of marker information that is has collected from plural vantage points. More specifically, the HMD 104 can use each instance of marker information to virtually project a ray into the environment. In some implementations, that ray originates from the reference point r associated with the HMD 104 and passes through the x, y position of the marker information within the corresponding instance of image information. The instance of image information, in turn, has a placement specified by the position p of the HMD 104 (at the time that the instance of image information was captured). Plural such rays associated with different vantage points will intersect, but generally not at a single intersection point.

The HMD 104 can choose a final position based on the manner in which the rays intersect. Generally stated, the HMD 104 chooses a final position that lies in the middle of the intersection points defined by the intersection of the rays. By virtue of this position-averaging technique, the HMD 104 can reduce the error in its determination of the position of the marker 110.

The HMD 104 may repeat all of the above-described steps when it determines that the user's field of view encompasses another physical marker, such as the marker 108.

FIG. 2 shows one kind of marker 202 that can be used in the physical environment of FIG. 1. The marker 202 has a generally circular shape. The marker 202 also includes a pattern that maps to a unique marker-specific code. For instance, the pattern can include dark and light regions that map to a binary code ranging from 0 to 255. Other implementations can use any other kind(s) of markers, such as markers bearing bar codes, Quick Read (QR) codes, etc.

An application, in turn, can map each marker code to a set of information items. For example, an application can associate a specific marker code with information that describes the type of aircraft to which the corresponding physical marker is attached, and the location on the aircraft at which it is attached, etc.

FIG. 3 shows an instance of image information 302 captured by the HMD 104. In this example, assume that the HMD 104 includes a single video camera having a sensor for capturing the image information 302. For instance, the sensor may correspond to a complementary metal-oxide-semiconductor (CMOS) sensor. The sensor has a two-dimensional surface, with each element on that surface corresponding to a pixel having a particular row and column position. Hence, positions in the image information 302 map to corresponding pixels of the sensor.

The instance of image information 302 contains marker information 304 that depicts the physical marker 110 placed in the environment. The HMD 104 stores the x, y position of the marker information 304. For instance, the HMD 104 may represent the center position of the marker information 304 in the image information 302 as the marker information's x, y position. The x, y position of the marker information 304 corresponds to a specific pixel in the video camera's sensor having corresponding row and column values. That pixel, in turn, has a known (and fixed) position in relation to the reference point r 306 of the HMD 104. The HMD 104 also stores the position p of the HMD 104 at the time that it captured the image information 302. The HMD 104 can specify the position p in six degrees of freedom, defining the x, y, z position of the HMD 104 in space, and the orientation of the HMD 104 in space.

The HMD 104 may leverage the above-described information to virtually cast a ray 308 into the environment. In one implementation, the ray 308 emanates from the reference point r 306 and passes through the x, y position of the video camera's sensor. The position p, in turn, determines the overall placement of the reference point r in the world, as well as the position of the sensor which has a fixed relation to the reference point r. Based on this information alone, the HMD 104 can conclude that the marker 110 lies somewhere on the ray 308. By collecting additional instances of marker information, the HMD 104 can further refine its estimate of the position of the marker 110 (in a manner described more fully below with reference to FIGS. 14 and 15).

Note that different video cameras may employ different imaging mechanisms having different internal characteristics, and different relationships to the HMD 104 as a whole. For instance, different video cameras may use different arrangements of lens to direct received light onto their sensors. In view thereof, the above-described ray-casting operation can also take account for the device-specific intrinsic parameters associated with a video camera, such as a device-specific focal point, field-of-view, etc. As such, the manner in which a ray is cast in one type of device may differ from the manner in which a ray is cast in another type of device; the specifics of FIG. 3 are therefore set forth in the spirit of illustration, not limitation.

FIGS. 4-9 show representative modified-reality presentations provided by the HMD 104 in the course of determining the position of a single marker. Note that these figures show the modified-reality environment as it would appear to the user 102 viewing it through the HMD 104.

Beginning with FIG. 4, the HMD 104 displays a field-of-analysis indicator 402. The field-of-analysis indicator 402 identifies a region within the physical environment for which the HMD 104 is currently delivering a modified-reality experience. This region will be referred to below as a "target region." In one implementation, the field-of-analysis indicator 402 can correspond to rectangular area that presents the target region using a first brightness level b1; that area is set within a more encompassing area (outside the target region) that represents the environment with a second brightness level b2, where b2<b1. Alternatively, or in addition, the field-of-analysis indicator 402 can include a display feature that shows the border of the target region.

Assume that the aircraft 106 includes the above-described physical marker 110 affixed to its body. It also includes another physical marker 404. But assume that, at this time, the target region does not encompass either of these markers (110, 404).

The HMD 104 can display a search indicator whenever it is in a mode in which it is scanning the environment for the existence of a marker. Here, the search indicator can include a message 406 that is displayed in proximity to the target region, which conveys that the HMD 104 is scanning image information to determine whether it contains marker information. Alternatively, or in addition, the search indicator can modify the border of the target region in any manner, such as by providing blinking corner display features (an example of which is a blinking corner display feature 408). Alternatively, or in addition, the search indicator can display reconstructed surfaces within the target region (described below) in a strobed manner, e.g., by increasing the brightness of the reconstructed surfaces in a periodic manner to simulate a pulse moving over the reconstructed surfaces. Other implementations can use other strategies to alert the user 102 to the fact that the HMD 104 is currently scanning the environment for the presence of markers.

In one implementation, the HMD 104 may scan the environment for the presence of markers whenever the certainty associated with the aircraft's position (relative to the user 102) falls below a prescribed threshold level. This will happen, for instance, at a beginning of a session in which the user 102 begins interacting with the aircraft 106 using the HMD 104. Initially, the HMD 104 will have detected no markers, and therefore will not have sufficiently precise information as to the position of the aircraft 106 relative to the user 102. In addition, or alternatively, the user 102 may manually instruct the HMD 104 to search for markers. For example, the user 102 may manually invoke the scanning mode when the user 102 wishes to increase the precision at which the position of the aircraft 106 is determined relative to the user 102. In yet another case, the HMD 104 always scans for the presence of markers, regardless of the precision at which it currently detects the position of the user 102.

Figure 5:
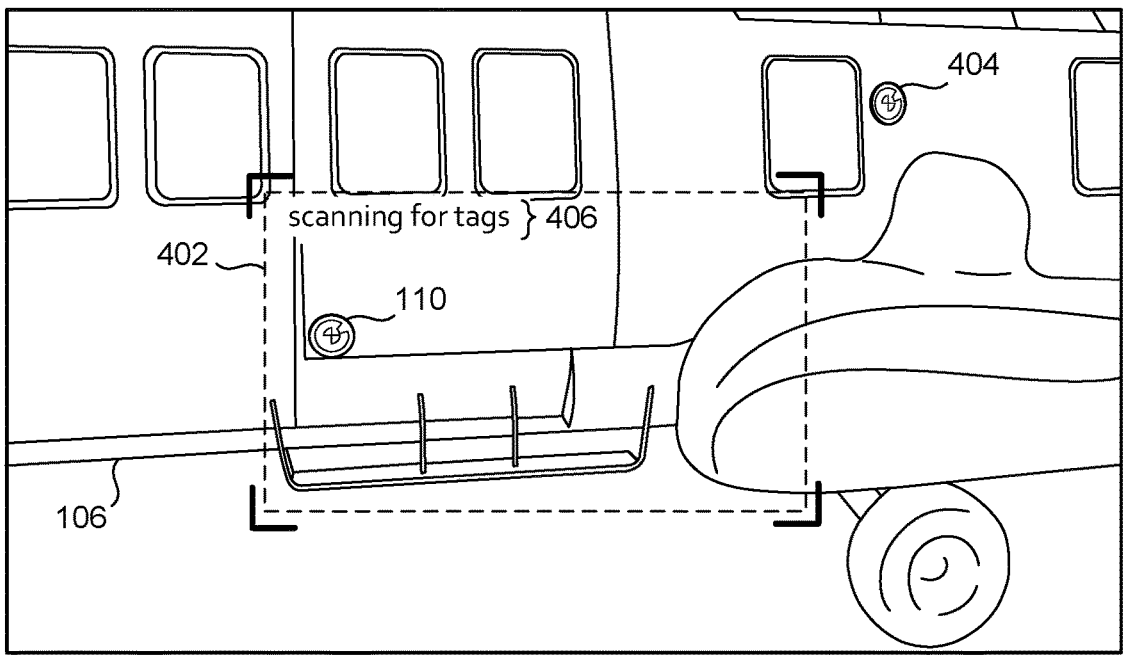

In the case of FIG. 5, assume that the user 102 has moved to a new position within the physical environment. At this vantage point, the target region now encompasses a view of the marker 110. But assume, at this stage, that the HMD 104 has not yet recognized that the image information associated with the target region contains the marker 110.

Figure 6:
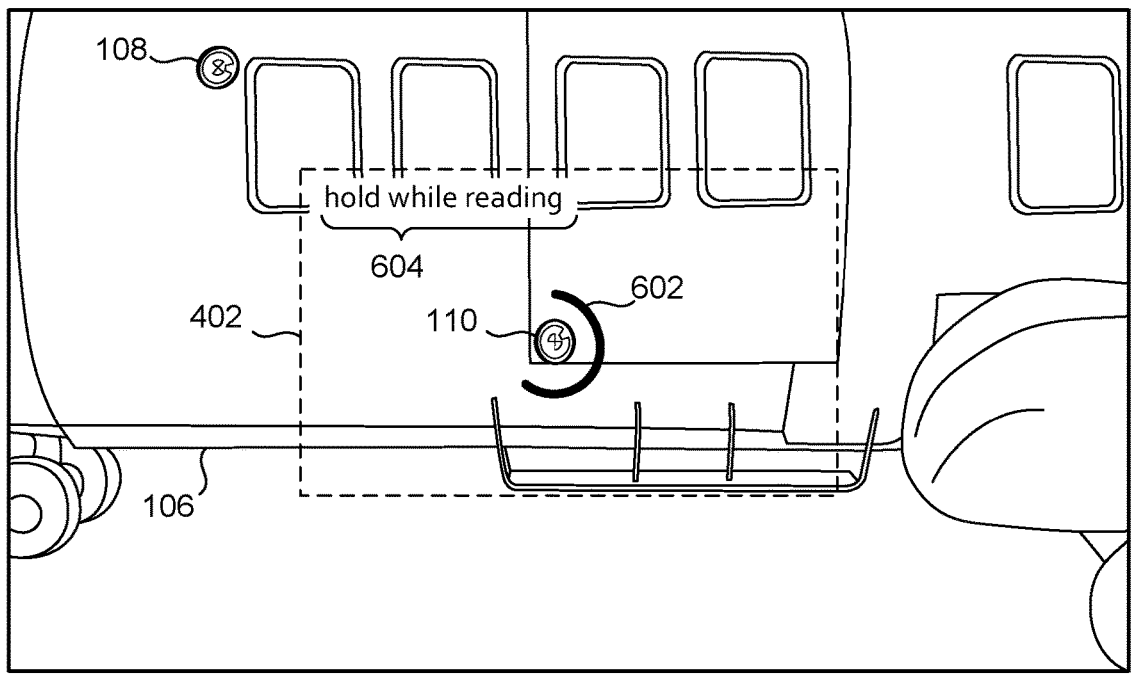

Advancing to FIG. 6, assume that, at this time, the HMD 104 detects that the image information potentially includes marker information. This causes the HMD 104 to perform the additional processing operations described above, which takes a finite amount of time to complete, and may involve analyzing plural frames of image information. The HMD 104 also displays a progress indicator 602 that shows the user 102 its level of progress in analyzing the image information. In this representative example, the progress indicator 602 corresponds to a bar-type display feature that dynamically extends around a representation of the marker 110 in a circular path. That is, the bar-type display feature includes a bar element that dynamically extends around the circumference of a circle in proportion to the HMD's level of progress in analyzing the image information. At a progress level of zero degrees, the progress indicator 602 conveys that no work has been done. At a progress level of 360 degrees, the progress indicator 602 conveys that the work has been completed. In other implementations, the HMD 104 can convey its progress using any other user interface feature, such as a linear bar-type display feature that is displayed beneath the representation of the marker 110. In addition, or alternatively, the HMD 104 can display a message 604 that informs the user 102 that the HMD 104 is processing image information for the purpose of detecting the marker information. The message 604 may also advise the user 102 to remain still to assist the HMD 104 in processing the image information.

Figure 7:
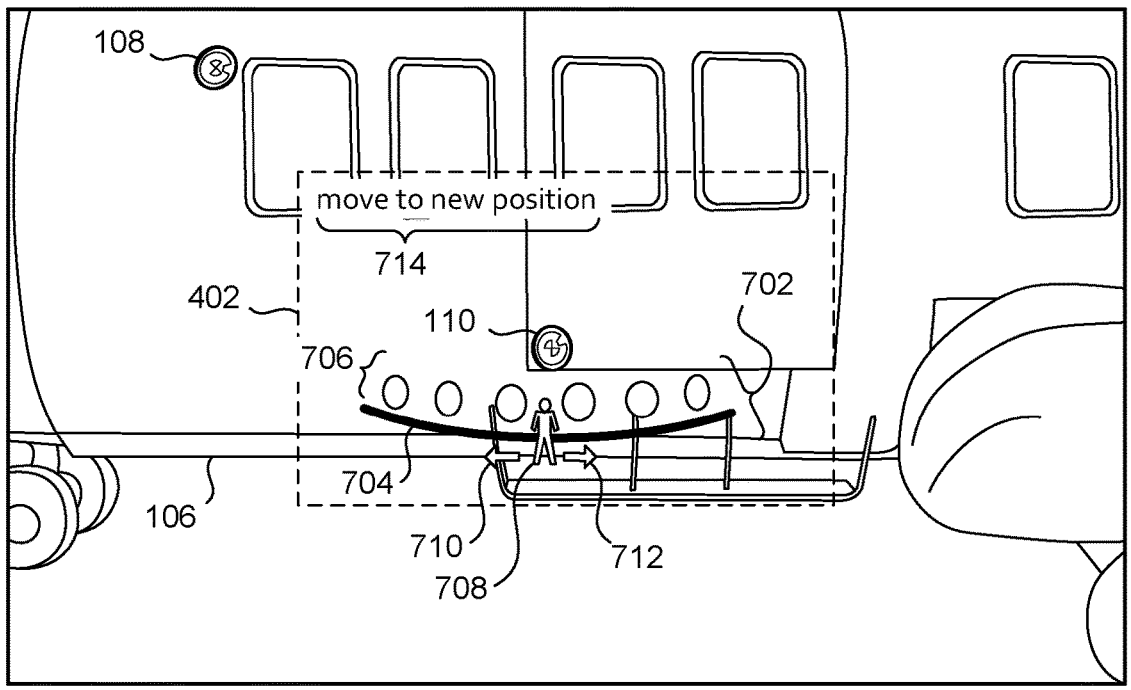

In FIG. 7, assume that the HMD 104 has finished processing the image information. The HMD 104 may then display a movement indicator 702 in the target region. In one merely representative implementation, the movement indicator 702 shows a line 704 that represents the path along which the user 102 may move. The line 704 may define an arc. The movement indicator 702 can also provide position indicators 706 that show discrete positions along the line 704 to which the user 102 may move. The movement indicator 702 can also provide a current-position indicator 708 that shows the current position of the user 102. The movement indicator 702 can include arrows (710, 712) that convey the directions at which the user 102 may move along the path defined by the line 704. Finally, the HMD 104 can also display a message 714 which instructs the user 102 to move to a new position.

In one implementation, the HMD 104 changes the visual appearance of any position indicator when it has successfully detected the presence of the marker 110 at the vantage point associated with that position indicator, e.g., by toggling an indicator from a non-completed state to a completed state. FIG. 7 shows an example in which none of the position indicators 706 is toggled to its completed state. However, per the operation described in FIG. 6, note that the HMD 104 has successfully detected the marker 110 at an initial vantage point. Hence, in another implementation of the operation described in FIG. 7, the HMD 104 could change the state of whatever position indicator corresponds to that initial vantage point.

Figure 8:
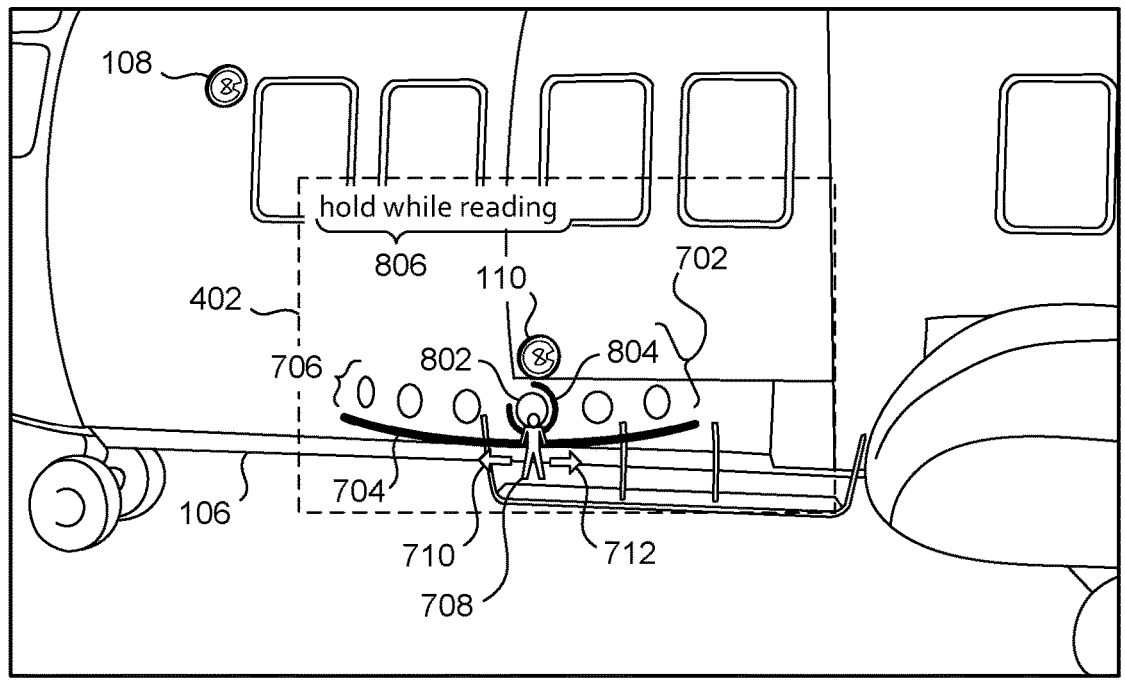

In FIG. 8, assume that the HMD 104 detects that the user 102 has moved to a vantage point associated with a particular position indicator 702. This vantage point is to the right of the user's position in FIG. 7. The current-position indicator 708 represents new position of the user 102. The HMD 104 then processes the image information captured at this vantage point in the same manner described above. The HMD 104 also displays a progress indicator 804 to convey its progress in processing the image information. The progress indicator 804 corresponds to a bar that dynamically extends around the position indicator 802. The HMD 104 can also display a message 806 which instructs the user 102 to remain stationary while it is processing the image information.

When the HMD 104 finishes processing the image information, the HMD 104 will change the state of the position indicator 802 to its completed state, e.g., by changing its color. This conveys the fact that the HMD 104 has successfully detected marker information in the image information at the vantage point associated with the position indicator 802. At this point, the movement indicator 702 provides assistance to the user 102 in moving to a new position.

Figure 9:
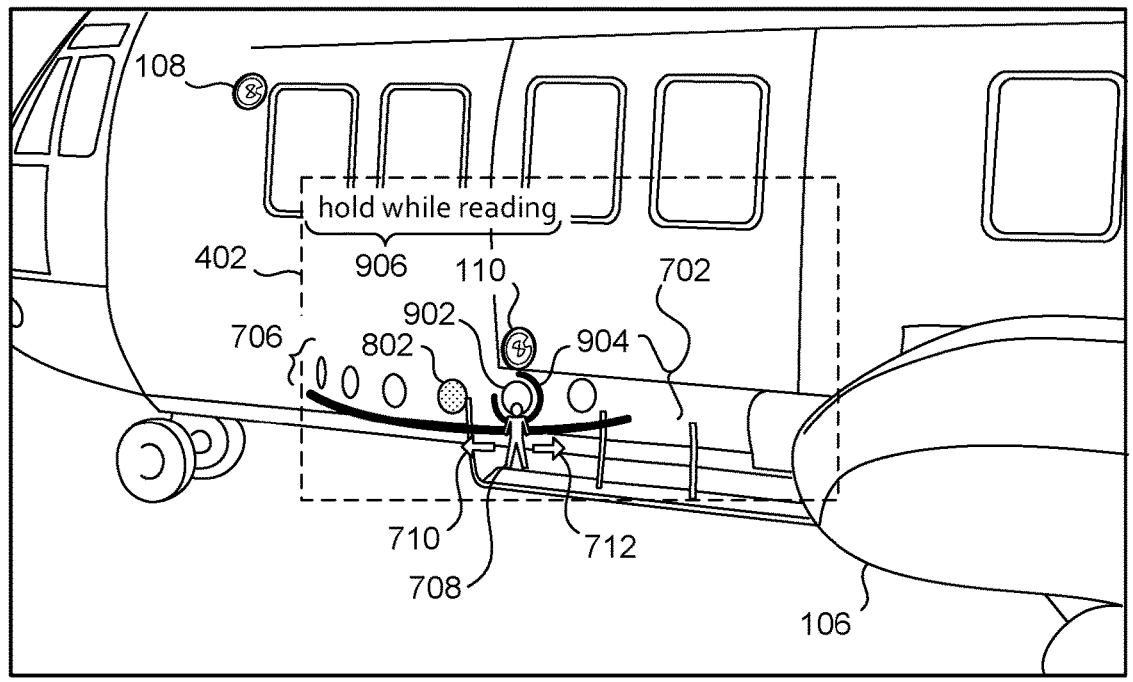

In FIG. 9, assume that the HMD 104 detects that the user 102 has moved to a vantage point associated with another position indicator 902. That vantage point is to the right of the user's position in FIG. 8. The HMD 104 then processes the image information captured at this vantage point in the same manner described above. That is, the HMD 104 displays a progress indicator 904 to convey its progress in processing the image information. The HMD 104 can also display a message 906 which instructs the user 102 to remain stationary while it is processing the image information.

The HMD 104 repeats the above-described procedure at zero, one or more additional vantage points until an application-specific termination condition has been reached. In one case, the HMD 104 repeats the procedure for each position indicator specified in the movement indicator 702. In another case, the HMD 104 repeats the procedure until it has detected the marker 110 at a prescribed number n of vantage points. That number n can be less that the number of position indicators 706 in the movement indicator 702. In another implementation, the HMD 104 repeats the procedure up to that time at which it has determined the position of the marker 110 with a sufficient degree of confidence. For example, the HMD 104 can compute a variation measure which reflects an extent to which rays cast at different vantage points intersect at a consistent location. The HMD 104 can repeat the procedure until the variation measure falls below a prescribed threshold level.

Further note that the HMD 104 can repeat the entire process described in FIGS. 4-9 for one or more additional markers. The HMD 104 can use different application-specific factors to determine how many unique markers it should detect. For instance, the HMD 104 can detect a predetermined number of markers. Or the HMD 104 can detect markers up to that time that it has determined the position of the aircraft 106 (relative to the user 102) with a sufficient degree of confidence. In another implementation, the HMD 104 processes each new marker it encounters, regardless of the confidence level at which it currently detects the position of the aircraft 106 relative to the user 102. In another implementation, the HMD 104 can detect markers when explicitly instructed to do so by the user 102. In another implementation, the HMD 104 can redetect a previously detected marker when certain factors are satisfied. For example, the HMD 104 can redetect a marker when a prescribed amount of time has elapsed since the marker was last detected.

Overall, the HMD 104 provides a process which assists the user 102 in interacting with the markers. As a first advantage, the HMD 104 explicitly exposes the marker-reading process to the user. This allows the user 102 to cooperate with the marker-reading processing to produce a satisfactory outcome, e.g., by remaining stationary when the HMD 104 is processing a marker. As a second advantage, the HMD 104 can explicitly guide the user 102 to a range of positions; at each such position, the HMD's video camera(s) can capture a clean image of the marker. Both factors increase the reliability at which the HMD 104 can determine the position of the marker. Without the above-described provisions, the HMD 104 might capture a marker at a single oblique angle with respect to the HMD's video camera(s). Moreover, the user 102 may be in motion while the marker is captured. These factors might cause the HMD 104 to capture a blurry image of the marker, which, in turn, may contribute to an inaccurate computation of the position of the marker.

Figure 10:
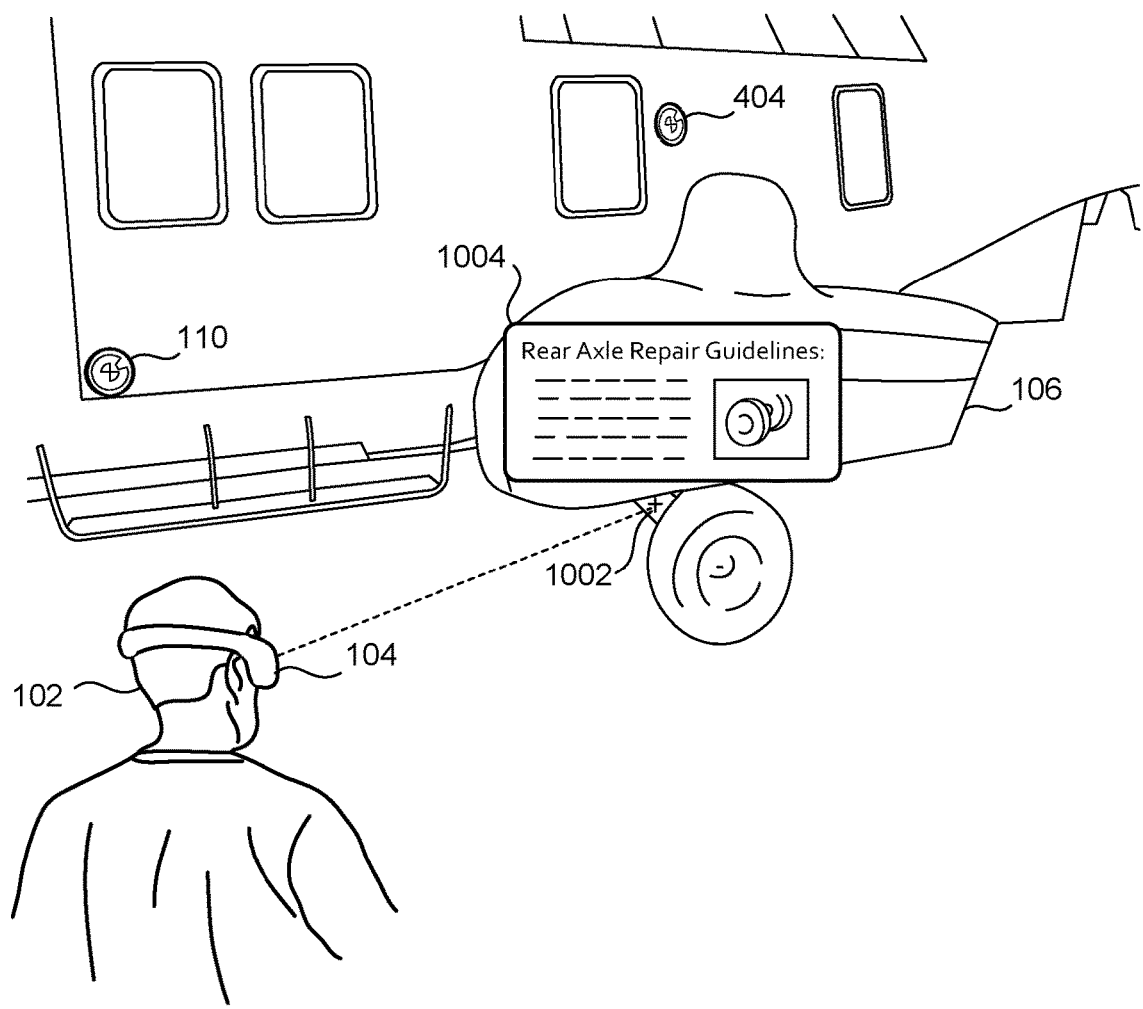
FIG. 10 shows one manner of using the computing device (of FIG. 1) to display virtual objects in combination with representations of real-world objects, to produce a modified-reality experience.

In FIG. 10 shows a mixed-reality experience that the HMD 104 displays to the user 102 after a sufficient number of markers have been detected. In this presentation, the HMD 104 uses its gaze detection engine to determine that the user 102 is looking at the rear axle 1002 of the aircraft 106. The HMD 104 then presents a virtual object 1004 in proximity to the rear axle 1002 within a mixed-reality presentation. Here, the virtual object 1004 can provide information to the user 102 which assists the user 102 in repairing the axle 1002. Also note that the markers that have been detected contain codes that identify the aircraft 106, thereby distinguishing the aircraft 106 from other aircraft of the same type and different types. The information provided in the virtual object 1004 thereby specifically pertains to the particular aircraft 106.

Note that the above procedure generally establishes the position of all locations associated with the aircraft 106 relative to the current location of the user 102. These locations encompass both exterior and interior locations. Hence, the HMD 104 can also present virtual objects to the user 102 when the user 102 enters the aircraft 106, or when the user 102 performs work in any interior space of the aircraft 106. This service is possible regardless of whether the aircraft 106 includes markers affixed to its interior surface. In some environments, it may be easier for the user 102 to establish the position of the aircraft 106 relative to the user 102 by primarily detecting external markers due to the potentially confined area in which to maneuver within the aircraft 106.

B. Illustrative Computing Device for Identifying Marker Positions

Figure 11:
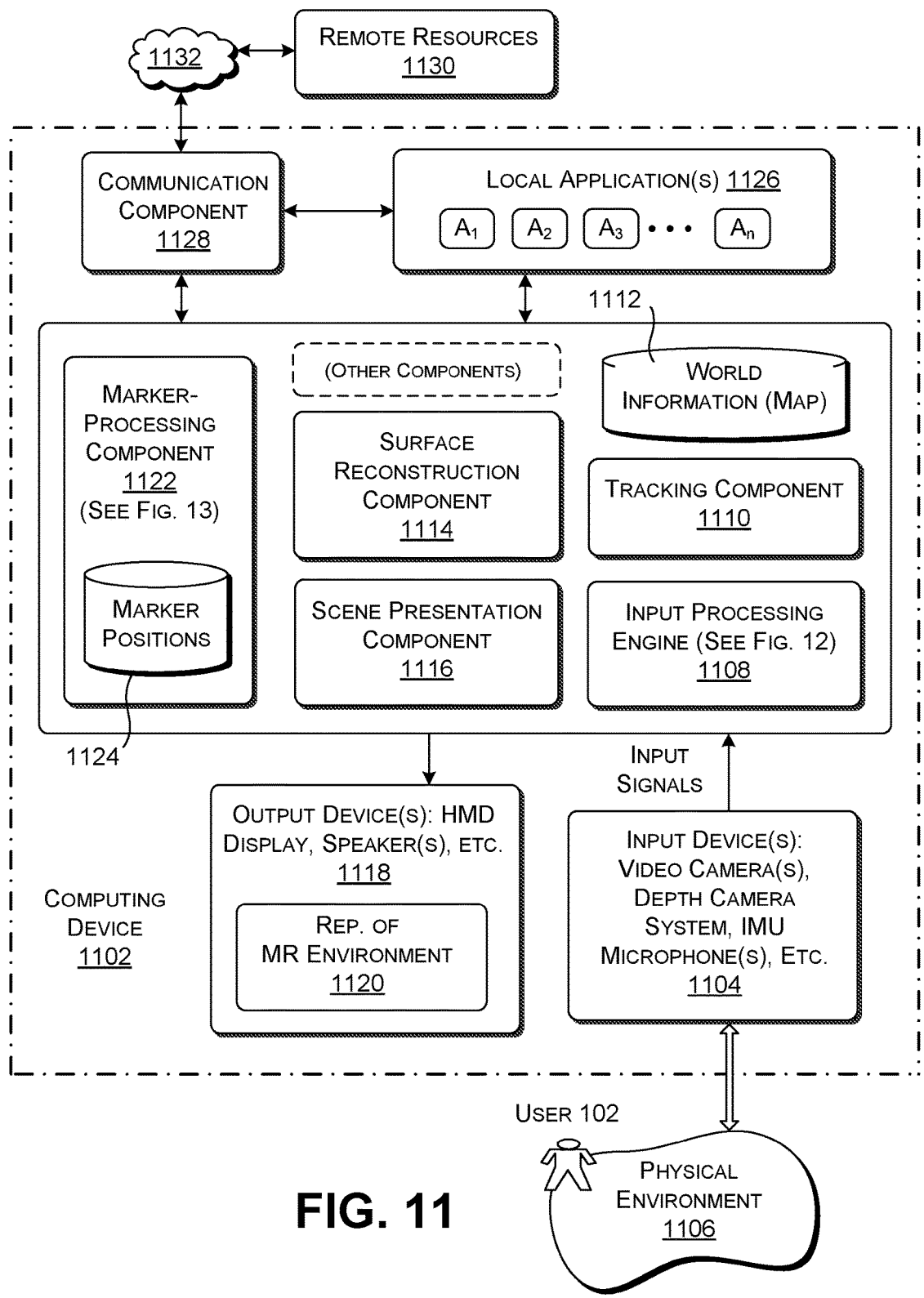
FIG. 11 shows one implementation of the computing device of FIG. 1.

FIG. 11 shows a computing device 1102 for implementing the HMD 104 in FIGS. 1 and 4-10. In other implementations, the computing device 1102 may correspond to a handheld computing device or some other type of computing device (besides an HMD, or in addition to an HMD).

The computing device 1102 includes a collection of input devices 1104 for interacting with a physical environment 1106, such as a scene containing the aircraft 106 shown in Section A. The input devices 1104 can include, but are not limited to: one or more environment-facing video cameras, an environment-facing depth camera system, a gaze-tracking system, an inertial measurement unit (IMU), one or more microphones, etc. One or more video cameras may produce red-green-blue (RGB) image information using a two-dimensional sensor of any type. One or more other video cameras may produce grayscale image information. The depth camera system produces image information in the form of a depth map using any kind of depth-capturing technology, such as a structured light technique, a stereoscopic technique, a time-of-flight technique, and so on. The depth map is composed of a plurality of depth values, where each depth value measures the distance between a scene point in the modified-reality environment and a reference point (e.g., corresponding to the location of the computing device 1102 in the environment 1106).

In one implementation, the IMU can determine the movement of the computing device 1102 in six degrees of freedom. The IMU can include one or more accelerometers, one or more gyroscopes, one or more magnetometers, etc. In addition, the input devices 1104 can incorporate other position-determining mechanisms for determining the position of the computing device 1102, such as a global positioning system (GPS) system, a beacon-sensing system, a wireless triangulation system, a dead-reckoning system, a near-field-communication (NFC) system, etc., or any combination thereof.

The gaze-tracking system can determine the position of the user's eyes and/or head. The gaze-tracking system can determine the position of the user's eyes, by projecting light onto the user's eyes, and measuring the resultant glints that are reflected from the user's eyes. Illustrative information regarding the general topic of eye-tracking can be found, for instance, in U.S. Patent Application No. 20140375789 to Lou, et al., published on Dec. 25, 2014, entitled "Eye-Tracking System for Head-Mounted Display." The gaze-tracking system can determine the position of the user's head based on IMU information supplied by the IMU (that is, in those cases in which the computing device 1102 corresponds to an HMD that is worn by the user's head).

Figure 12:
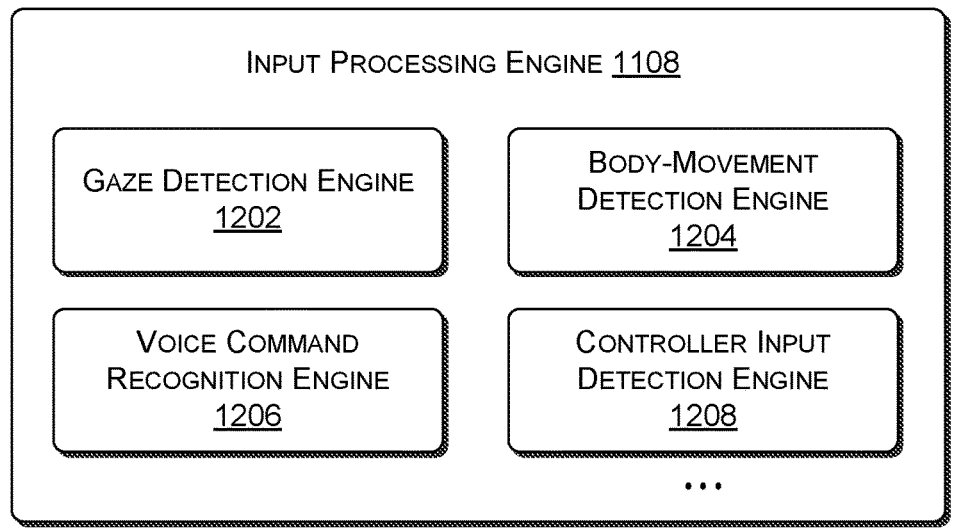
FIG. 12 shows one implementation of an input processing engine, which is an element of the computing device of FIG. 11.

An input processing engine 1108 performs any type of processing on the raw input signals fed to it by the input devices 1104. For example, the input processing engine 1108 can identify an object that the user 102 is presumed to be looking at in the modified-reality environment by interpreting input signals supplied by the gaze-tracking system. The input processing engine 1108 can also identify any bodily gesture performed by the user 102 by interpreting inputs signals supplied by the video camera(s) and/or depth camera system, etc. The input processing engine 1108 can also interpret any voice commands issued by the user 102 by analyzing audio input signals supplied by the microphone(s). The input processing engine 1108 can also interpret any control signal provided by a separate controller, which is manipulated by the user 102, e.g., using his or her hands. FIG. 12 provides additional information regarding one implementation of the input processing engine 1108.

In some implementations, a tracking component 1110 may create a map of the physical environment 1106, and then leverage the map to determine the location of the computing device 1102 in the physical environment 1106. A data store 1112 stores the map, which also constitutes world information that describes at least part of the modified-reality environment. The tracking component 1110 can perform the above-stated tasks using Simultaneous Localization and Mapping (SLAM) technology. In one implementation, the SLAM technology leverages image information provided by the video cameras and/or the depth camera system, together with IMU information provided by the IMU.

As to the localization task performed by the SLAM technology, the tracking component 1110 can attempt to localize the computing device 1102 in the environment 1106 by searching a current instance of the captured image information to determine whether it contains any image features specified in the map, with respect to a current state of the map. The image features may correspond, for instance, to edge detection points or other salient aspects of the captured image information, etc. The search operation yields a set of matching image features. The tracking component 1110 can then identify the current position and orientation of the computing device 1102 based on the matching image features, e.g., by performing a triangulation process. The tracking component 1110 can repeat the above-described image-based location operation at a first rate.

Between individual instances of the above-described image-based location operation, the tracking component 1110 can also compute the current position and orientation of the computing device 1102 based on current IMU information supplied by the IMU. This IMU-based location operation is less data-intensive compared to the image-based location operation, but potentially less accurate than the image-based location operation. Hence, the tracking component 1110 can perform the IMU-based location operation at a second rate that is greater than the first rate (at which the image-based location operation is performed). The image-based location operation corrects any errors that have accumulated in the IMU-based location operation.

As to the map-building task of the SLAM technology, the tracking component 1110 can identify image features in the current instance of captured image information that have no matching counterparts in the existing map. The tracking component 1110 can then add these new image features to the current version of the map, to produce an updated map. Over time, the tracking component 1110 progressively discovers additional aspects of the environment 1106, and thus progressively produces a more detailed map.

Note that the tracking component 1110 can determine the position of various parts of the aircraft 106 relative to the user 102. But the tracking component 1110 does not provide relative position information with the same level of precision as the technique described in Section A. For instance, the tracking component 1110 can collect feature points that generally mark the location of a wall, but do not necessarily identify individual positions associated with that wall relative to the user 102 with a high degree of precision. The technique described in Section A, by contrast, enables such precision in determining relative positions.

In one implementation, the tracking component 1110 can use an Extended Kalman Filter (EFK) to perform the above-described SLAM operations. An EFK maintains map information in the form of a state vector and a correlation matrix. In another implementation, the tracking component 1110 can use a Rao-Blackwellised filter to perform the SLAM operations. Background information regarding the general topic of SLAM can be found in various sources, such as Durrant-Whyte, et al., "Simultaneous Localisation and Mapping (SLAM): Part I The Essential Algorithms," in *IEEE Robotics & Automation Magazine*, Vol. 13, No. 2, July 2006, pp. 99-110, and Bailey, et al., "Simultaneous Localization and Mapping (SLAM): Part II," in *IEEE Robotics & Automation Magazine*, Vol. 13, No. 3, September 2006, pp. 108-117.

Alternatively, the computing device 1102 can receive a predetermined map of the physical environment 1106, without the need to perform the above-described SLAM map-building task.

A surface reconstruction component 1114 identifies surfaces in the modified-reality environment based on image information provided by the video cameras, and/or the depth camera system, and/or the map provided by the tracking component 1110. The surface reconstruction component 1114 can then add information regarding the identified surfaces to the world information provided in the data store 1112.

In one approach, the surface reconstruction component 1114 can identify principal surfaces in a scene by analyzing a 2D depth map captured by the depth camera system at a current time, relative to the current location of the user 102. For instance, the surface reconstruction component 1114 can determine that a given depth value is connected to a neighboring depth value (and therefore likely part of a same surface) when the given depth value is no more than a prescribed distance from the neighboring depth value. Using this test, the surface reconstruction component 1114 can distinguish a foreground surface from a background surface. The surface reconstruction component 1114 can improve its analysis of any single depth map using any machine-trained pattern-matching model and/or image segmentation algorithm. The surface reconstruction component 1114 can also use any least-squares-fitting techniques, polynomial-fitting techniques, patch-assembling techniques, etc.

Alternatively, or in addition, the surface reconstruction component 1114 can use known fusion techniques to reconstruct the three-dimensional shapes of objects in a scene by fusing together knowledge provided by plural depth maps. Illustrative background information regarding the general topic of fusion-based surface reconstruction can be found, for instance, in: Keller, et al., "Real-time 3D Reconstruction in Dynamic Scenes using Point-based Fusion," in Proceedings of the 2013 International Conference on 3D Vision, 2013, pp. 1-8; Izadi, et al., "KinectFusion: Real-time 3D Reconstruction and Interaction Using a Moving Depth Camera," in Proceedings of the 24th Annual ACM Symposium on User Interface Software and Technology, October 2011, pp. 559-568; and Chen, et al., "Scalable Real-time Volumetric Surface Reconstruction," in ACM Transactions on Graphics (TOG), Vol. 32, Issue 4, July 2013, pp. 113-1 to 113-10.

Additional information on the general topic of surface reconstruction can be found in: U.S. Patent Application No. 20110109617 to Snook, et al., published on May 12, 2011, entitled "Visualizing Depth"; U.S. Patent Application No. 20150145985 to Gourlay, et al., published on May 28, 2015, entitled "Large-Scale Surface Reconstruction that is Robust Against Tracking and Mapping Errors"; U.S. Patent Application No. 20130106852 to Woodhouse, et al., published on May 2, 2013, entitled "Mesh Generation from Depth Images"; U.S. Patent Application No. 20150228114 to Shapira, et al., published on Aug. 13, 2015, entitled "Contour Completion for Augmenting Surface Reconstructions"; U.S. Patent Application No. 20160027217 to da Veiga, et al., published on Jan. 28, 2016, entitled "Use of Surface Reconstruction Data to Identity Real World Floor"; U.S. Patent Application No. 20160110917 to Iverson, et al., published on Apr. 21, 2016, entitled "Scanning and Processing Objects into Tree-Dimensional Mesh Models"; U.S. Patent Application No. 20160307367 to Chuang, et al., published on Oct. 20, 2016, entitled "Raster-Based mesh Decimation"; U.S. Patent Application No. 20160364907 to Schoenberg, published on Dec. 15, 2016, entitled "Selective Surface Mesh Regeneration for 3-Dimensional Renderings"; and U.S. Patent Application No. 20170004649 to Romea, et al., published on Jan. 5, 2017, entitled "Mixed Three Dimensional Scene Reconstruction from Plural Surface Models."

A scene presentation component 1116 can use known graphics pipeline technology to produce a three-dimensional (or two-dimensional) representation of the modified-reality environment. The scene presentation component 1116 generates the representation based at least on virtual content provided by an invoked application, together with the world information in the data store 1112. The graphics pipeline technology can include vertex processing, texture processing, object clipping processing, lighting processing, rasterization, etc. Overall, the graphics pipeline technology can represent surfaces in a scene using meshes of connected triangles or other geometric primitives. Background information regarding the general topic of graphics processing is described, for instance, in Hughes, et al., *Computer Graphics: Principles and Practices*, Third Edition, Adison-Wesley publishers, 2014. When used in conjunction with an HMD, the scene processing component 1116 can also produce images for presentation to the left and rights eyes of the user 102, to produce the illusion of depth based on the principle of stereopsis.

One or more output devices 1118 provide a representation of the modified-reality environment 1120. The output devices 1118 can include any combination of display devices, including a liquid crystal display panel, an organic light emitting diode panel (OLED), a digital light projector, etc. In one implementation, the output devices 1118 can include a semi-transparent display mechanism. That mechanism provides a display surface on which virtual objects may be presented, while simultaneously allowing the user 102 to view the physical environment 1106 "behind" the display device. The user 102 perceives the virtual objects as being overlaid on the physical environment 1106 and integrated with the physical environment 1106.

The output devices 1118 may also include one or more speakers. The speakers can provide known techniques (e.g., using a head-related transfer function (HRTF)) to provide directional sound information, which the user 102 perceives as originating from a particular location within the physical environment 1106.

A marker-processing component 1122 delivers the user experience shown in Section A. That is, the marker-processing component 1122 determines the position of points in the environment 1106 (relative to the user 102) by detecting physical markers that have been previously placed in the environment 1106. The marker-processing component 1122 temporarily stores position information in a data store 1124. The marker-processing component 1122 also updates the world information in the data store 1112 based on the position information that it identifies. Addition information regarding the operation of the marker-processing component 1122 is set forth below with respect to FIG. 13.

The computing device 1102 can include a collection of local applications 1126, stored in a local data store. Each local application can perform any function. For example, one illustrative application can provide guidance to the user 102 as the user 102 repairs a vehicle, as in the example of Section A. Another illustrative application can perform a game-related function, etc.

A communication component 1128 allows the computing device 1102 to interact with remote resources 1130. Generally, the remote resources 1130 can correspond to one or more remote computer servers, and/or one or more user devices (e.g., one or more remote HMDs operated by other users), and/or other kind(s) of computing devices. The computing device 1102 may interact with the remote resources 1130 via a computer network 1132. The computer network 1132, in turn, can correspond to a local area network, a wide area network (e.g., the Internet), one or more point-to-point links, etc., or any combination thereof. The communication component 1128 itself may correspond to a network card or other suitable communication interface mechanism.

In one case, the computing device 1102 can access remote computing logic to perform any function(s) described above as being performed by the computing device 1102. For example, the computing device 1102 can offload the task of building a map and/or reconstructing a surface (described above as being performed by the tracking component 1110 and surface reconstruction component 1114, respectively) to the remote computing logic. For instance, the remote computing logic may correspond to a cloud-computing platform implemented by plural remote computer servers. The computing device 1102 may use this strategy to expedite the execution of certain data-intensive tasks, and/or to reduce the complexity of the computing device 1102.

In another case, the computing device 1102 can access a remote computer server to download a new application, or to interact with a remote application (without necessarily downloading it).

FIG. 12 shows one implementation of the input processing engine 1108. The input processing engine 1108 can include a gaze detection engine 1202 for interpreting the gaze of the user 102. In one approach, the gaze detection engine 1202 identifies the direction in which the user's eyes and/or head are pointed based on input signals provided by the gaze-tracking system. The gaze detection engine 1202 then projects a ray into the modified-reality environment in the identified direction of the user's gaze. The gaze detection engine 1202 then identifies the location at which the ray intersects a surface within the modified-reality environment.

A body-movement detection engine 1204 determines whether the user 102 has performed a telltale bodily gesture. The body-movement detection engine 1204 can perform this task by comparing image information captured by the input devices 1104 with pre-stored patterns associated with the particular gestures. Background information regarding gesture recognition technology can be found, for instance, in: U.S. Pat. No. 7,996,793 to Latta, et al., published on Aug. 9, 2011, entitled "Gesture Recognizer System Architecture"; and U.S. Application No. 20120162065 to Tossell, et al., published on Jun. 28, 2012, entitled "Skeletal Joint Recognition and Tracking System."

A voice command recognition engine 1206 interprets the user's voice commands. The voice command recognition engine 1206 can use any technology for performing this task, such as a neural network or a Hidden Markov Model (HMI). Such a model maps voice input signals to a classification result; the classification result identifies the command spoken by the user 102, if any.

A controller input detection engine 1208 interprets control signals provided by a controller. That is, the controller may correspond to a device that the user 102 manipulates with or her hands, e.g., by using the controller to point to objects in the environment 1106. The controller has its own IMU and/or other position-determining mechanisms that provide control signals to the computing device 1102. The controller input detection engine 1208 can process these control signals by comparing the control signals to pre-stored control signatures, associated with particular gestures or commands.

Figure 13:
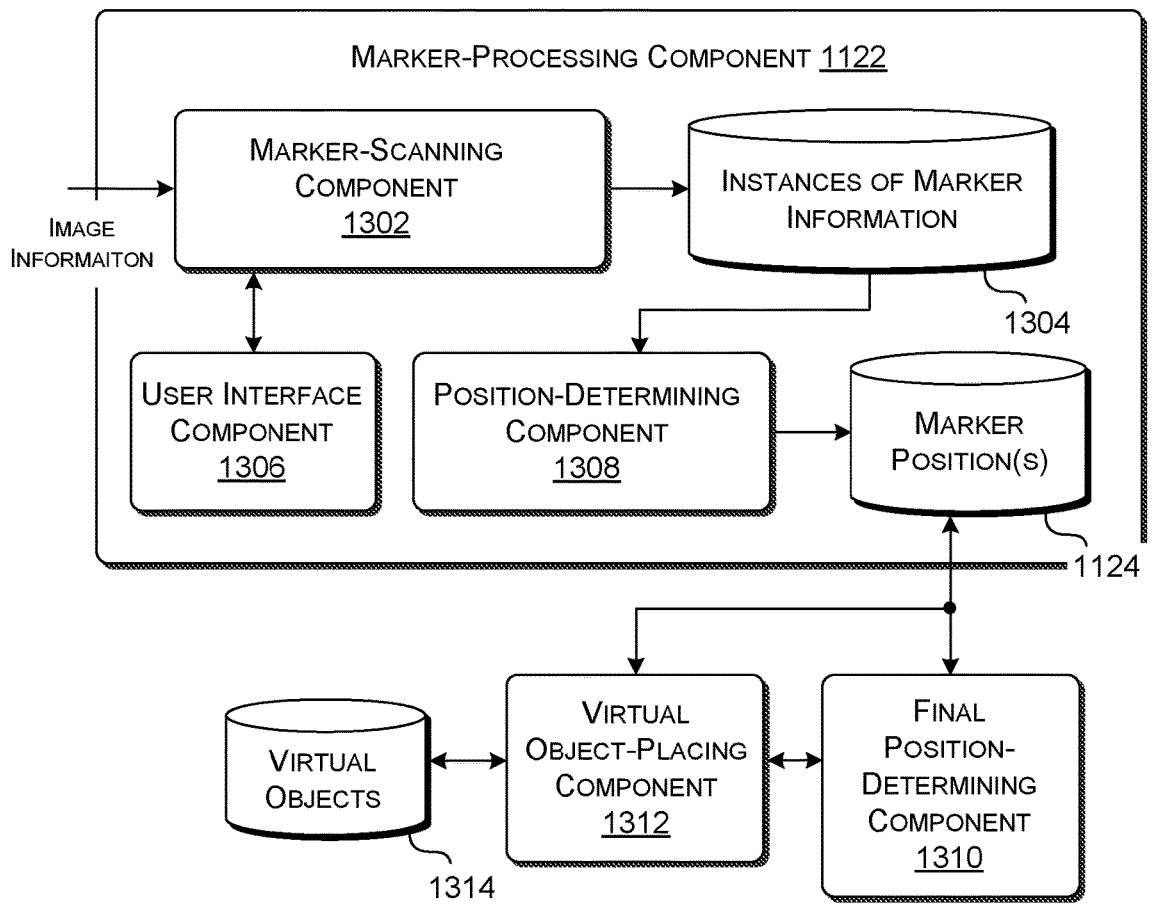
FIG. 13 shows one implementation of a marker-processing component, which is another element of the computing device of FIG. 11.

FIG. 13 shows one implementation of the marker-processing component 1122 introduced in the context of FIG. 11. The marker-processing component 1122 includes a marker-scanning component 1302 that receives image information provided by one or more video cameras. The marker-scanning component 1302 analyzes the image information to determine whether it contains an instance of marker information associated with a physical marker in the environment 1106. The marker-scanning component 1302 may perform this operation in the manner described in Section A. As a result of its processing, the marker-scanning component 1302 stores the x, y position of the marker information in a data store 1304, as well as the marker information itself. As noted above, the x, y position may identify a particular pixel in the a video camera's sensor, which, in turn, has a known position relative to a reference point r of the HMD 104. The marker-scanning component 1302 also stores the position p of the computing device 1102 at the time that the image information was captured, which can also be used to determine the position of the video camera(s) associated with the computing device 1102. The position p can be expressed in six degrees of freedom.

A user interface component 1306 generates the various indicators described above, including a search indicator, a progress indicator, and a movement indicator. The search indicator reveals when the computing device 1102 is in a scanning mode. In the scanning mode, the computing device 102 analyzes the image information to determine whether it contains marker information. The progress indicator conveys the progress of the computing device 1102 in the course of analyzing one or more instances of the image information. The movement indicator guides the user 102 in moving from one vantage point to another vantage point in the environment 1106.

The user interface component 1306 can generate the search indicator in different ways. In a first implementation, the user interface component 1306 can cast an anchor ray from the vantage point at which it initially detects a marker, e.g., in the same manner described above with reference to FIG. 3. This anchor ray is associated with an anchor vantage point. The user interface component 1306 can then generate one or more other vantage points at fixed offsets from the anchor vantage point. For example, the user interface component 1306 can define other rays that are separated from the anchor ray by increments of 22.5°, to one or more sides of the anchor ray. Those additional rays are associated with respective additional vantages points. Overall, this procedure defines the collection of position indicators 706 shown in FIG. 7, which are associated with respective vantage points that have been determined.

In a second implementation, the user interface component 1306 can first determine the orientation of a surface associated with the marker based on image information provided by the depth capture system. Or the user interface component 1306 can use a machine-learned classifier to process the image information provided by the video camera(s). The machine-learned classifier can generate an output result that indicates the positional relationship of the marker relative to the user 102 at the current time. The machine-learned classifier can receive various input features indicative of this positional relationship, such as the surface area of the marker information as it appears in the image information.

The user interface component 1306 can then determine an anchor vantage point to which the user 102 may move to look at the marker flush in its face, that is, by looking at the marker along a normal projected from the marker's surface. In some cases, it is not feasible for the user 102 to assume this ideal position, e.g., because the user 102 may be confined to one or more horizontal walking surfaces, which prevents the user 102 from moving to the ideal position. In that case, the user interface component 1306 can determine a vantage point to which the user 102 may move to see the largest surface area of the marker that is possible, given the constraints affecting the user 102.

The user interface component 1306 defines a center point along the line 704 (shown in FIGS. 7-9) that corresponds to the anchor vantage pointed determined in the manner described above. The user interface component 1306 can then generate one or more vantage points to the left of the center point, and one or more vantage points to the right of the center point. For instance, the user interface component 1306 can define vantage points at fixed angular offsets from the center point, e.g., corresponding to 22.5° offsets from the center point.

Thus, in summary, in the first implementation, the user interface component 1306 selects the anchor vantage point to corresponds to the position at which it initially detects the marker. In the second implementation, the user interface component 1306 selects the anchor vantage point to correspond to the position at which the HMD is looking most squarely at the face of the marker. Still other implementations are possible.

The user interface component 1306 can determine that the user 102 has moved to a vantage point specified by a position indicator based on information provided by the IMU, and/or based on the localization functionality provided by the tracking component 1110.

Other implementations of the user interface component 1306 can use other strategies to provide instructions to the user 102. For example, alternatively, or in addition, the user interface component 1306 can provide audible instructions to the user 102 to provide any of the search indicator, the progress indicator, and/or the movement indicator.

A position-determining component 1308 can determine the position of a marker based on plural instances (samples) of marker information collected by the marker-scanner component 1302. The plural instances of marker information capture the same marker at different vantage points. The position-determining component 1308 then stores the position of the marker in the data store 1124.

Figure 14:
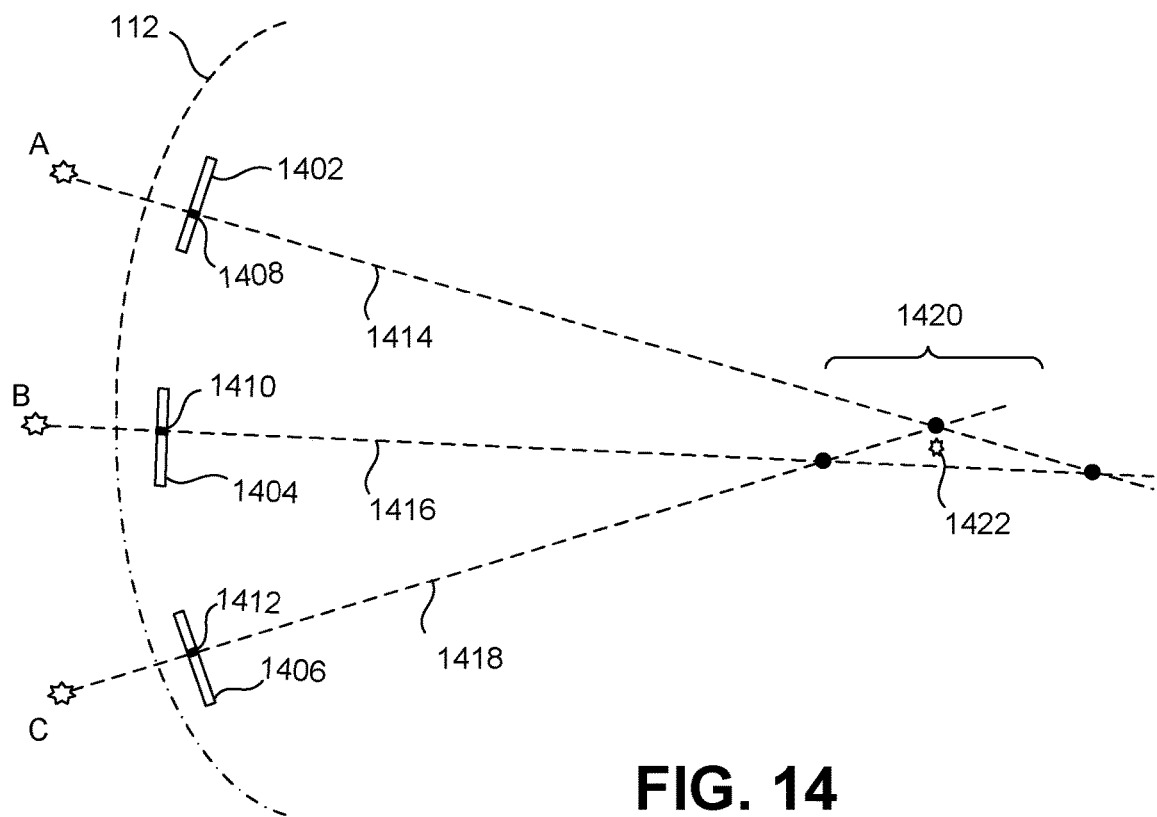
FIG. 14 shows one manner by which a position-determining component (which is an element of the marker-processing component of FIG. 13) can identify the position of a marker.

Advancing momentarily to FIG. 14, this figure shows one approach by which the position-determining component 1308 can compute the position of a marker. Assume that the data store 1304 stores three instances of image information (1402, 1404, and 1406) collected at three respective vantage points (A, B, and C), although, more generally, image information can detected at any number k of vantage points. The three instances of image information (1402, 1404, 1406) include three respective instances of marker information (1408, 1410, 1412). The computing device 1102 can represent each instance of marker information by its center position x, y, which also defines a pixel in the video camera's sensor. The position-determining component 1308 projects a virtual ray through each instance of marker information in the same manner described with respect to FIG. 3. The ray's course is determined by at least the reference point r of the HMD (from which it is considered to originate), the x, y position of the marker information (through which it passes), and the position p of the HMD (which determines the overall placement of the sensor in the world). More specifically, FIG. 14 shows that the position-determining component 1308 projects a first ray 1414 through the first marker information 1408, a second ray 1416 through the second marker information 1410, and a third ray 1418 through the third marker information 1412. In an alternative implementation, the marker-scanning component 1302 can perform the ray-casting operation described above rather than the position-determining component 1308.

The position-determining component 1308 can then determine intersection information 1420 which generally describes the manner in which the rays (1414, 1416, 1418) intersect with each other. More specifically, the rays (1414, 1416, 1418) will generally not converge on a single point, but will define a plurality of intersection points. The intersection information 1420 describes these intersection points. The position-determining component 1308 then determines an estimated final position 1422 based on the intersection information 1420. The position-determining component 1308 can use various algorithms to determine this estimated final position 1422, such as by computing an average of the intersection points for each dimension of the intersection points (x, y, and z).

Figure 15:
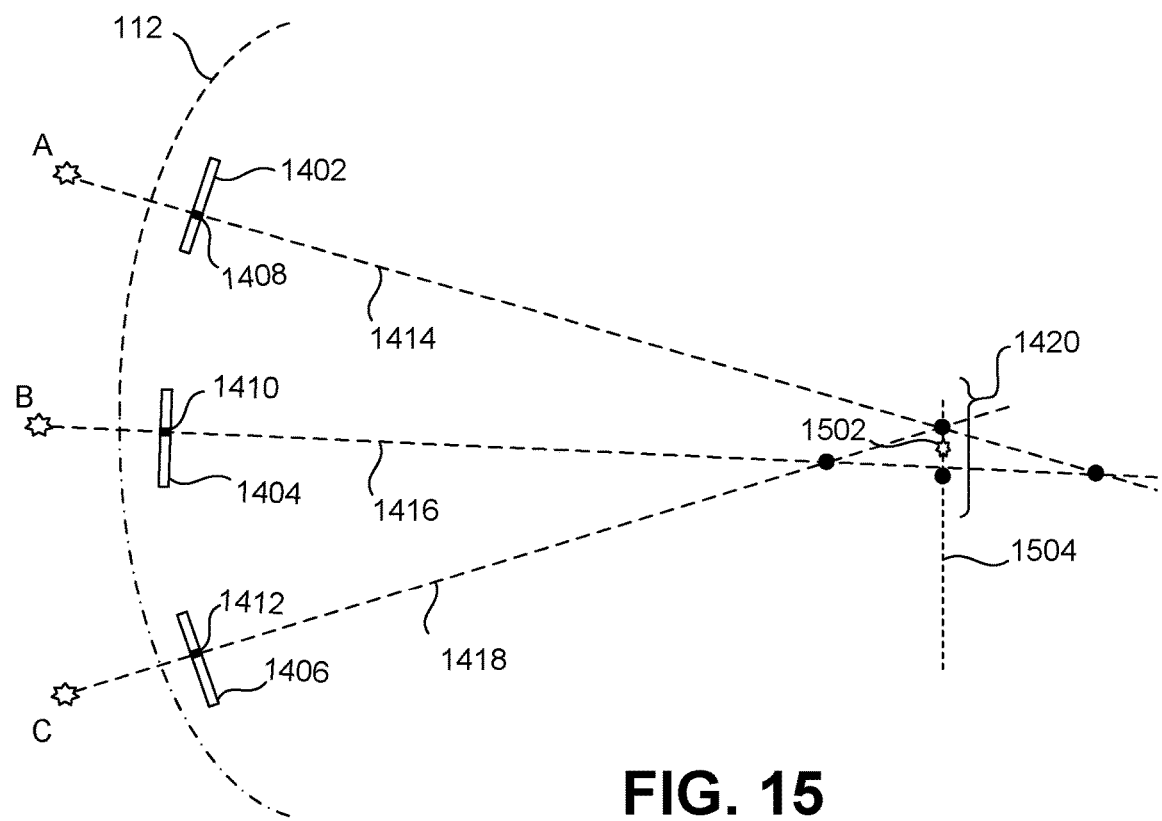
FIG. 15 shows another way in which the position-determining component can determine the position of a marker.

FIG. 15 shows another approach by which the position-determining component 1308 can determine the position of a marker. The approach of FIG. 15 is the same as the approach of FIG. 14 except that the position-determining component 1308 restricts a final position 1502 such that it lies on a reconstructed surface 1504 in the modified-reality environment. For instance, in the examples of Section A, the reconstructed surface corresponds to the surface of the aircraft 106. More generally, the position-determining component 1308 can identify a reconstructed surface that is closest to the intersection points. The position-determining component 1308 can then snap the final position 1502 to that reconstructed surface.

The position-determining component 1308 can use yet other techniques for determining a final position of a marker that do not involve ray casting. For instance, the position-determining component 1308 can rely on the image information provided by the depth camera system to provide a candidate position for the marker for each vantage point. The position-determining component 1308 can then choose a final position of the marker by determining the center of the cluster of points thus defined, e.g., by determining the average of the points for each dimension of the points.

Returning to FIG. 13, a final position-determining component 1310 can generate a final estimate of the positions of various parts of the environment 1106 (e.g., various parts of the aircraft 106) relative to the user 102 based on the positions of the markers specified in the data store 1124. The final position-determining component 1310 can use various techniques to perform this operation, such as triangulation.

A virtual object-placing component 1312 places a virtual object in the modified-reality environment based on the estimated positions provided by the final position-determining component 1310. A data store 1314 stores virtual objects that can be placed in the modified-reality environment.

FIG. 13 shows that the marker-processing component 1122 is separate from the final position-determining component 1310, the virtual object-placing component 1312, and the data store 1314. For example, an operating system of the computing device 1102 may implement the marker-processing component 1122, while an individual application can implement any of the final position-determining component 1310, the virtual object-placing component 1312, and the data store 1314. More generally, different implementations can allocate the components shown in FIG. 13 to different parts of the computing device 1102 in any manner. For instance, in another implementation, the marker-processing component 1122 can incorporate the final position-determining component 1310.

C. Illustrative Processes

Figure 16:
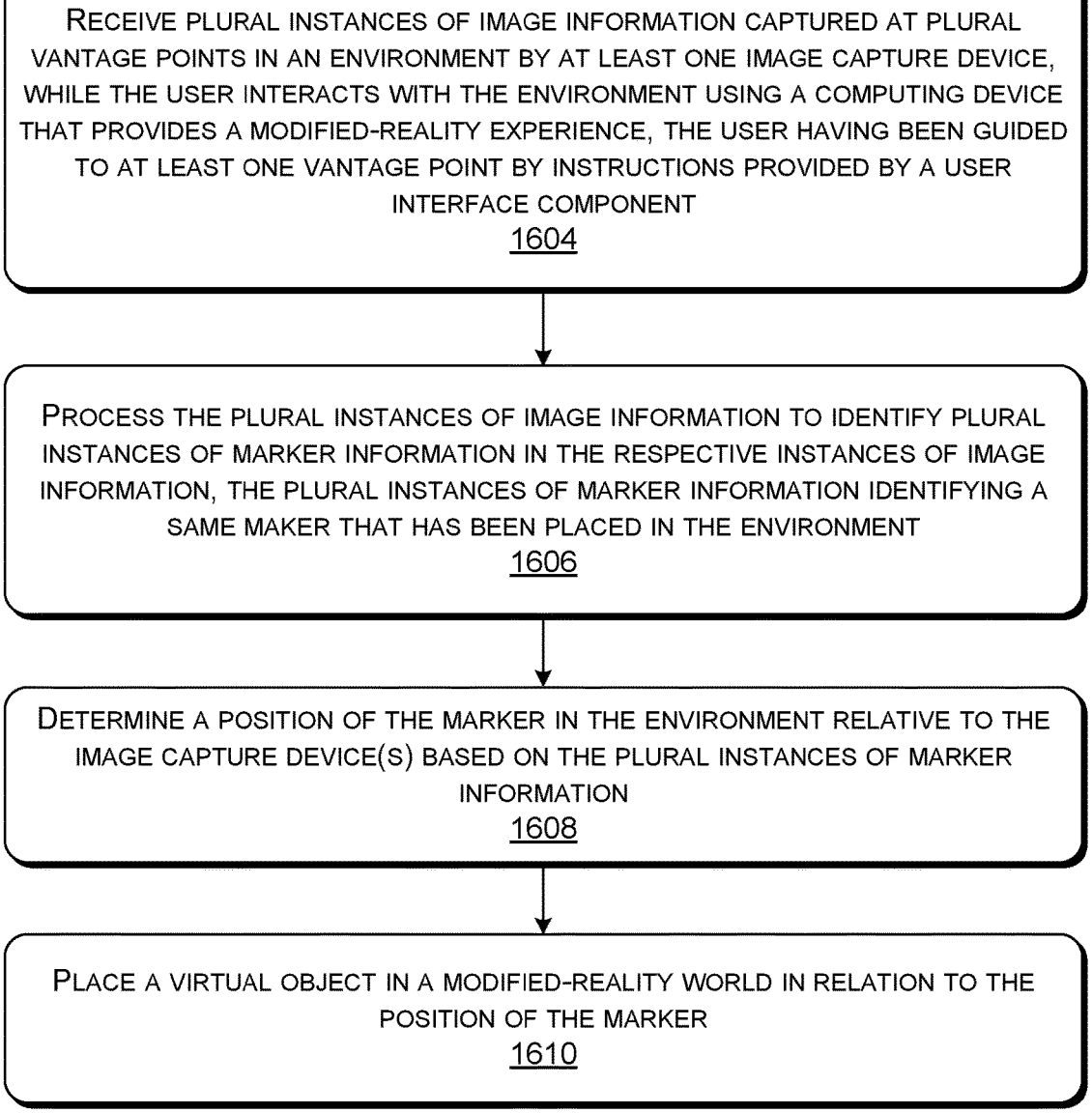
FIG. 16 shows a process that describes an overview of one manner of operation of the computing device of FIG. 11.
Figure 18:
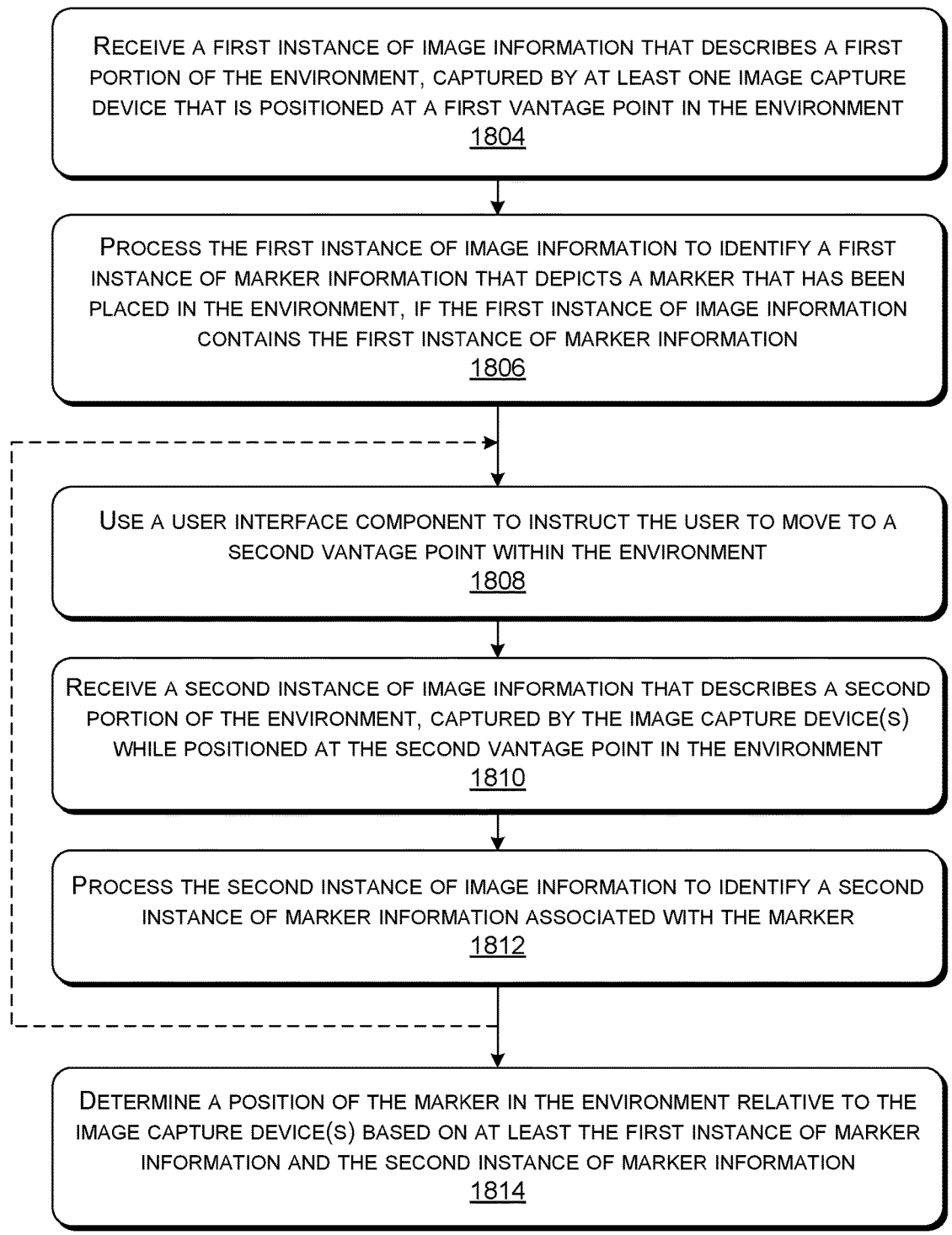
FIG. 18 shows a process that represents one particular way of implementing the process of FIG. 16.

FIGS. 16-18 show processes that explain the operation of the computing device 1102 of Sections B in flowchart form. Since the principles underlying the operation of the computing device 1102 have already been described in Section B, certain operations will be addressed in summary fashion in this section. As noted in the prefatory part of the Detailed Description, each flowchart is expressed as a series of operations performed in a particular order. But the order of these operations is merely representative, and can be varied in any manner.

FIG. 16 shows a process 1602 that describes an overview of one manner of operation of the computing device 1102 of FIG. 11. In block 1604, the computing device 1102 receives plural instances of image information captured at plural vantage points in an environment 1106 by at least one image capture device (such as one or more grayscale and/or RGB video cameras). Simultaneously, the computing device 1102 provides a modified-reality experience while the user 102 interacts with the environment 1106. Further, the computing device 1102 guides the user 102 to at least one vantage point by instructions provided by a user interface component. In block 1606, the computing device 1102 processes the plural instances of image information to identify plural instances of marker information in the respective instances of image information. The plural instances of marker information identify a same maker that has been placed in the environment 1106. In block 1608, the computing device 1102 determines a position of the marker in the environment 1106 relative to the image capture device(s) based on the plural instances of marker information. In block 1610, the computing device 1102 places a virtual object in a modified-reality world in relation to the position of the marker.

FIG. 17 shows a process 1702 that describes one way of determining the position of a marker based on plural instances of marker information (collected per the process of FIG. 16). In block 1704, the computing device 1102 virtually projects a plurality of rays into the environment 1106, each ray being based on at least: a position of an instance of marker information in a corresponding instance of image information; and a placement of the image capture device(s) in the environment 1106 while at a particular vantage point in the environment 1106. In block 1706, the computing device 1102 identifies intersection information that describes a manner in which the plurality of rays intersect. In block 1708, the computing device 1102 determines the position of the marker based on the intersection information.

FIG. 18 shows a process 1802 that represents one particular way of implementing the process 1602 of FIG. 16. In block 1804, the computing device 1102 receives a first instance of image information that describes a first portion of the environment 1106, captured by at least one image capture device that is positioned at a first vantage point in the environment 1106. In block 1806, the computing device 1102 processes the first instance of image information to identify a first instance of marker information that depicts a marker that has been placed in the environment 1106, if the first instance of image information contains the first instance of marker information. In block 1808, the computing device 1102 uses a user interface component to instruct the user 102 to move to a second vantage point within the environment 1106. In block 1810, the computing device 1102 receives a second instance of image information that describes a second portion of the environment 1106, captured by the image capture device(s) while positioned at the second vantage point in the environment 1106. In block 1812, the computing device 1102 processes the second instance of image information to identify a second instance of marker information associated with the marker. In block 1814, the computing device 1102 determines a position of the marker in the environment 1106 relative to the image capture device(s) based on at least the first instance of marker information and the second instance of marker information. Note that FIG. 18 describes a process 1802 for determining the position of the marker based on two vantage points, but, more generally, the process 1802 can determine the position of the marker based on n vantage points, where n≥2.

D. Representative Computing Functionality

Figure 19:
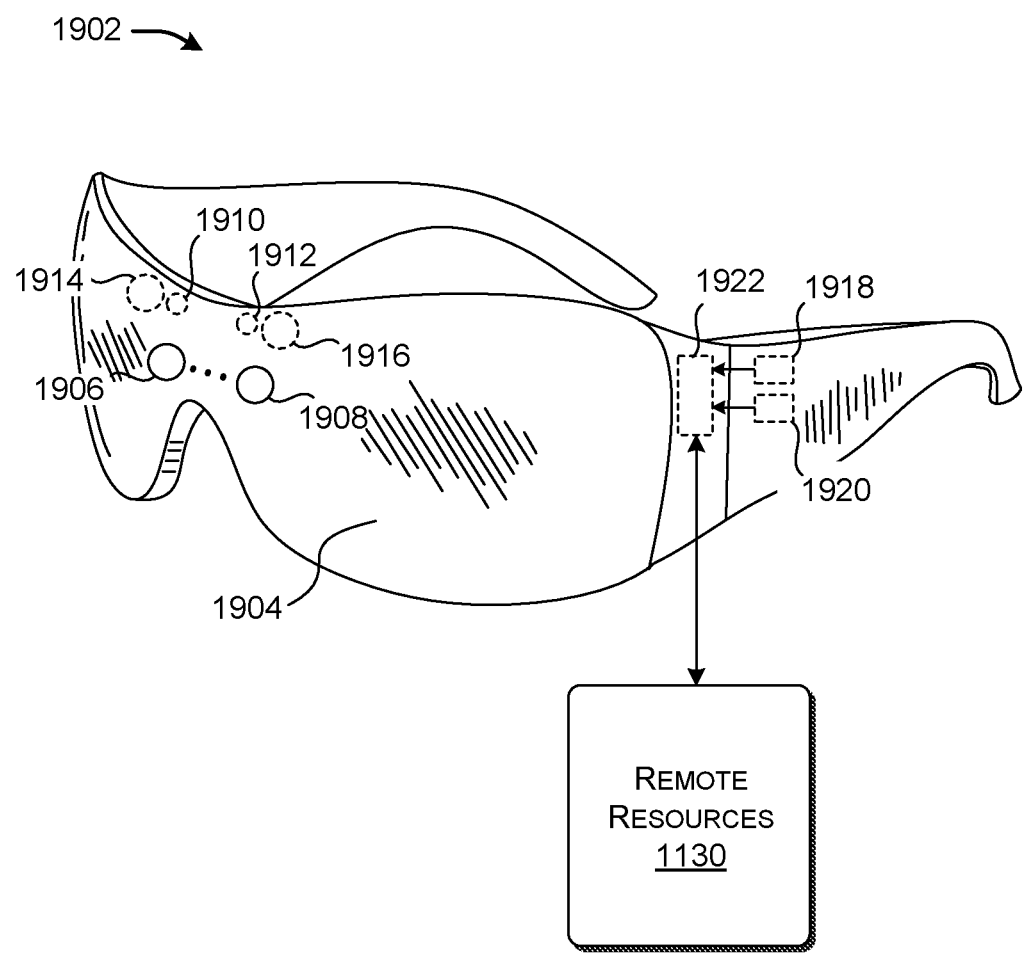
FIG. 19 shows a head-mounted display (HMD), which can be used to implement at least parts of the computing device of FIG. 11.

FIG. 19 shows a head-mounted display (HMD) 1902, which can be used to implement at least parts of the computing device 1102 of FIG. 11. The HMD 1902 includes a head-worn frame that houses or otherwise affixes a see-through display device 1904 or an opaque (non-see-through) display device. Waveguides (not shown) or other image information conduits direct left-eye images to the left eye of the user 102 and direct right-eye images to the right eye of the user 102, to overall create the illusion of depth through the effect of stereopsis. Although not shown, the HMD 1902 can also include speakers for delivering sounds to the ears of the user 102.

The HMD 1902 can include any environment-facing cameras, such as representative environment-facing cameras 1906 and 1908. The cameras (1906, 1908) can include RGB cameras, grayscale cameras, a depth camera system, etc. While FIG. 19 shows only two cameras (1906, 1908), the HMD 1902 can include any number of cameras of different camera type(s). Although not shown, the depth camera system also includes an illumination source which directs electromagnetic radiation into the environment.

The HMD 1902 can include an inward-facing gaze-tracking system. For example, the inward-facing gaze-tracking system can include light sources (1910, 1912) for directing light onto the eyes of the user 102, and cameras (1914, 1916) for detecting the light reflected from the eyes of the user 102.

The HMD 1902 can also include other input mechanisms, such as one or more microphones 1918, an inertial measurement unit (IMU) 1920, etc. The IMU 1920, in turn, can include one or more accelerometers, one or more gyroscopes, one or more magnetometers, etc., or any combination thereof.

A controller 1922 can include logic for performing any of the tasks described above in FIG. 11. The controller 1922 may optionally interact with the remote resources 1130 via the communication component 1128 (shown in FIG. 11).

Figure 20:
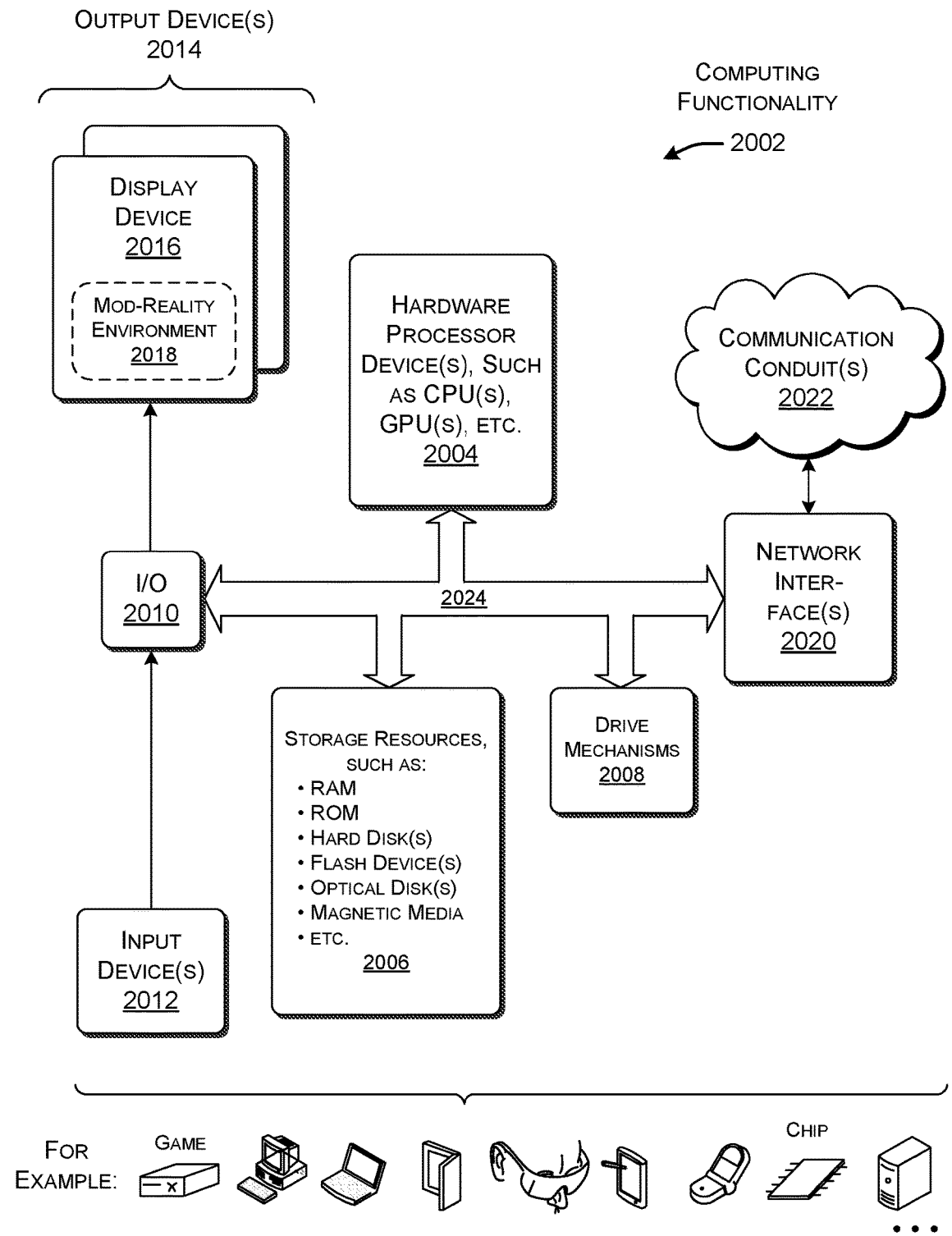
FIG. 20 shows illustrative computing functionality that can be used to implement any aspect of the features shown in the foregoing drawings.

FIG. 20 more generally shows computing functionality 2002 that can be used to implement any aspect of the mechanisms set forth in the above-described figures. For instance, the type of computing functionality 2002 shown in FIG. 20 can be used to implement the HMD 1902 of FIG. 19, or, more generally, the computing device 1102 of FIG. 11. In all cases, the computing functionality 2002 represents one or more physical and tangible processing mechanisms.

The computing functionality 2002 can include one or more hardware processor devices 2004, such as one or more central processing units (CPUs), and/or one or more graphics processing units (GPUs), and so on. The computing functionality 2002 can also include any storage resources (also referred to as computer-readable storage media or computer-readable storage medium devices) 2006 for storing any kind of information, such as machine-readable instructions, settings, data, etc. Without limitation, for instance, the storage resources 2006 may include any of RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removable component of the computing functionality 2002. The computing functionality 2002 may perform any of the functions described above when the hardware processor device(s) 2004 carry out computer-readable instructions stored in any storage resource or combination of storage resources. For instance, the computing functionality 2002 may carry out computer-readable instructions to perform each block of the processes described in Section C. The computing functionality 2002 also includes one or more drive mechanisms 2008 for interacting with any storage resource, such as a hard disk drive mechanism, an optical disk drive mechanism, and so on.

The computing functionality 2002 also includes an input/output component 2010 for receiving various inputs (via input devices 2012), and for providing various outputs (via output devices 2014). Illustrative input devices and output devices were described above in the context of the explanation of FIG. 11. For instance, the input devices 2012 can include any combination of video cameras, a depth camera system, microphones, an IMU, etc. The output devices 2014 can include a display device 2016 that presents a modified-reality environment 2018, speakers, etc. The computing functionality 2002 can also include one or more network interfaces 2020 for exchanging data with other devices via one or more communication conduits 2022. One or more communication buses 2024 communicatively couple the above-described components together.

The communication conduit(s) 2022 can be implemented in any manner, e.g., by a local area computer network, a wide area computer network (e.g., the Internet), point-to-point connections, etc., or any combination thereof. The communication conduit(s) 2022 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality 2002 (and its hardware processor(s)) can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc. In this case, the machine-executable instructions are embodied in the hardware logic itself The following summary provides a non-exhaustive list of illustrative aspects of the technology set forth herein.

According to a first aspect, a method is described for identifying a position of a marker in an environment using one or more computing devices that provide a modified-reality experience to a user. The method includes: receiving a first instance of image information that describes a first portion of the environment, captured by at least one image capture device that is positioned at a first vantage point in the environment; processing the first instance of image information to identify a first instance of marker information that depicts a marker that has been placed in the environment (that is, if the first instance of image information contains the first instance of marker information); using a user interface component to instruct the user to move to a second vantage point within the environment; receiving a second instance of image information that describes a second portion of the environment, captured by the image capture device(s) while positioned at the second vantage point in the environment; processing the second instance of image information to identify a second instance of marker information associated with the marker; and determining a position of the marker in the environment relative to the image capture device(s) based on at least the first instance of marker information and the second instance of marker information.

According to a second aspect, the above-referenced computing device(s) is associated with a head-mounted display.

According to a third aspect, the method further includes, prior to identifying the first instance of marker information, using the user interface component to provide a search indicator that conveys that image information is being searched for an instance of marker information.

According to a fourth aspect, the above-referenced operation of processing the first instance of image information includes using the user interface component to provide a progress indicator that conveys an extent of progress of the computing device(s) in identifying the first instance of marker information.

According to a fifth aspect, the progress indicator corresponds to a display feature that grows in length in proportion to the progress.

According to a sixth aspect, the method further includes displaying a representation of the first instance of marker information on a display device. The progress indicator corresponds to a display feature that advances around the representation of the first instance of marker information in proportion to the progress.

According to a seventh aspect, the user interface component provides the instruction by providing a movement indicator that describes one or more vantage points to which the user is invited to move, the vantage point(s) being arrayed along a path.

According to an eighth aspect, the movement indicator also conveys each vantage point at which the method has already successfully identified an instance of marker information, if any.

According to a ninth aspect, the method further includes receiving at least one additional instance of image information, and, for each additional instance of image information that is collected at a particular vantage point, identifying at least one additional instance of marker information.

According to a tenth aspect, the above-referenced determining operation includes: using the first instance of marker information to virtually project a first ray into the environment, based on at least: a position of the first instance of marker information in the first instance of image information; and a placement of the image capture device(s) in the environment while at the first vantage point; using the second instance of marker information to virtually project a second ray into the environment, based on at least: a position of the second instance of marker information in the second instance of image information; and a placement of the image capture device(s) in the environment while at the second vantage point; identifying an intersection of the first ray and the second ray; and determining the position of the marker based on the intersection.

According to an eleventh aspect, the determining operation further includes constraining the position of the marker to lie on an identified reconstructed surface, corresponding to a detected physical surface in the environment.

According to a twelfth aspect, the method further includes repeating the method to identify at least one additional marker.

According to a thirteenth aspect, the method further includes placing a virtual object in a modified-reality world in relation to the position of the marker, and presenting the virtual object to the user on a display device.

According to a fourteenth aspect, one or more computing devices are described for identifying a position of a marker in an environment. The computer device(s) includes a marker-scanning component configured to: successively receive plural instances of image information captured at plural vantage points in the environment by at least one image capture device; and process the instances of image information to identify instances of marker information in the respective instances of image information, the plural instances of marker information depicting a same maker that has been placed in the environment. The computer device(s) also includes a user interface component configured to guide a user in moving to at least one vantage point in the environment at which an instance of image information is captured by the image capture device(s). The computer device(s) also includes a position-determining component configured to determine a position of the marker in the environment relative to the image capture device(s) based on the plural instances of marker information.

According to a fifteenth aspect, the user interface component also provides a progress indicator that reveals an extent of progress in identifying an instance of marker information in a respective instance of image information.

According to a sixteenth aspect, the position-determining component is configured to determine the position of the marker by: virtually projecting a plurality of rays into the environment, each ray being based on at least: a position of an instance of marker information in a corresponding instance of image information; and a placement of the image capture device(s) in the environment while at a particular vantage point in the environment; identifying intersection information that describes a manner in which the plurality of rays intersect; and determining the position of the marker based on the intersection information.

According to a seventeenth aspect, the position-determining component is further configured to constrain the position of the marker to lie on an identified reconstructed surface, corresponding to a detected physical surface in the environment.

According to an eighteenth aspect, the computer device(s) further includes an object-placing component that is configured to place a virtual object in a modified-reality world in relation to the position of the marker.

According to a nineteenth aspect, a computer-readable storage medium is described for storing computer-readable instructions. The computer-readable instructions, when executed by one or more processor devices, perform a method that includes: receiving plural instances of image information captured at plural vantage points in an environment by at least one image capture device, while the user interacts with the environment using a computing device that provides a modified-reality experience, the user having been guided to at least one vantage point by instructions provided by a user interface component; processing the plural instances of image information to identify plural instances of marker information in the respective instances of image information, the plural instances of marker information identifying a same maker that has been placed in the environment; determining a position of the marker in the environment relative to the image capture device(s) based on the plural instances of marker information; and placing a virtual object in a modified-reality world in relation to the position of the marker.

According to a twentieth aspect, the determining operation (with reference to the nineteenth aspect) includes: virtually projecting a plurality of rays into the environment, each ray being based on at least: a position of an instance of marker information in a corresponding instance of image information; and a placement of the image capture device(s) in the environment while at a particular vantage point in the environment; identifying intersection information that describes a manner in which the plurality of rays intersect; and determining the position of the marker based on the intersection information.

A twenty-first aspect corresponds to any combination (e.g., any permutation or subset that is not logically inconsistent) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method performed by one or more computing devices, the method comprising:
    scanning image information reflecting different regions of environment for an indication of a physical marker, the image information being captured by at least one image capture device;
    in an instance when an individual region being scanned does not include the physical marker, outputting a search indicator conveying that the environment is being scanned for the physical marker;
    responsive to detecting an indication that the physical marker is present in a particular region of the environment, initiating a position-determining process for the physical marker, the position-determining process comprising:
    receiving a first instance of image information captured by the at least one image capture device while positioned at a first vantage point in the environment;
    identifying a first instance of marker information in the first instance of image information that depicts the physical marker;
    instructing, via a user interface, a user to move to a second vantage point within the environment relative to the physical marker;
    receiving a second instance of image information captured by said at least one image capture device while positioned at the second vantage point in the environment;
    processing the second instance of image information to identify a second instance of marker information that depicts the physical marker; and
    determining a position of the physical marker in the environment relative to the at least one image capture device based on at least the first instance of marker information and the second instance of marker information.

2. The method of claim 1, wherein said one or more computing devices are associated with a head-mounted display.

3. The method of claim 1, wherein the search indicator comprises a display feature presented on the user interface.

4. The method of claim 1, further comprising:
    after detecting the indication that the physical marker is present in the particular region of the environment, displaying a progress indicator that conveys an extent of progress of said one or more computing devices in confirming that the first instance of marker information depicts the physical marker.

5. The method of claim 4, wherein the progress indicator corresponds to a display feature that grows in length in proportion to the progress.

6. The method of claim 4,
    further comprising displaying a representation of the first instance of marker information on a display device,
    wherein the progress indicator corresponds to a display feature that advances around the representation of the first instance of marker information in proportion to the progress.

7. The method of claim 1, further comprising:
    providing, on the user interface, a movement indicator that describes a plurality of vantage points to which the user is invited to move along a path.

8. The method of claim 7, further comprising:
    as individual instances of marker information are successfully identified at individual vantage points, updating the movement indicator to indicate that the individual instances of marker information have been successfully identified at the individual vantage points.

9. The method of claim 1, further comprising receiving at least one additional instance of image information, and, for each additional instance of image information that is collected at a particular vantage point, identifying at least one additional instance of marker information.

10. The method of claim 1, wherein said determining comprises:
    using the first instance of marker information to virtually project a first ray into the environment based on at least a position of the first instance of marker information in the first instance of image information and a placement of said at least one image capture device in the environment while at the first vantage point;
    using the second instance of marker information to virtually project a second ray into the environment based on at least a position of the second instance of marker information in the second instance of image information and a placement of said at least one image capture device in the environment while at the second vantage point;
    identifying an intersection of the first ray and the second ray; and determining the position of the physical marker based at least on the intersection.

11. The method of claim 10, further comprising constraining the position of the physical marker to lie on an identified reconstructed surface, corresponding to a detected physical surface in the environment.

12. The method of claim 1, further comprising repeating the method to identify another position of at least one additional physical marker that is present in the environment.

13. The method of claim 1, further comprising placing a virtual object in a modified-reality world in relation to the position of the physical marker, and presenting the virtual object on a display device.

14. One or more computing devices comprising:
a hardware processor; and
a storage resource storing machine-readable instructions which, when executed by the hardware processor, cause the hardware processor to:
using at least one image capture device, scan an environment for an initial indication that a real-world marker is present in a target region;
prior to identifying the initial indication that the real-world marker is present in the target region, output a search indicator conveying that the one or more computing devices are scanning for the real-world marker;
after identifying the initial indication that the real-world marker is present in the target region, successively receive plural instances of image information captured at plural vantage points in the environment by the at least one image capture device;
process the plural instances of image information to identify instances of marker information in the respective instances of image information, the instances of marker information depicting the real-world marker that is present in the environment; and
determine a position of the real-world marker in the environment relative to the at least one image capture device based at least on the instances of marker information.

15. The one or more computing devices of claim 14, wherein the machine-readable instructions, when executed by the hardware processor, cause the hardware processor to:
detect the initial indication that the real-world marker is present in the target region by identifying a group of pixels having a particular color associated with the real-world marker.

16. The one or more computing devices of claim 14, wherein the machine-readable instructions, when executed by the hardware processor, cause the hardware processor to determine the position of the real-world marker by:
virtually projecting a plurality of rays into the environment, each ray being based on at least: a position of an instance of marker information in a corresponding instance of image information and a placement of said at least one image capture device in the environment while at a corresponding vantage point in the environment;
identifying intersection information that describes a manner in which the plurality of rays intersect; and
determining the position of the real-world marker based at least on the intersection information.

17. The one or more computing devices of claim 16, wherein the machine-readable instructions, when executed by the hardware processor, cause the hardware processor to:
constrain the position of the real-world marker to lie on an identified reconstructed surface, corresponding to a detected physical surface in the environment.

18. The one or more computing devices of claim 14, machine-readable instructions, when executed by the hardware processor, cause the hardware processor to:
output the search indicator as text conveying that the target region is being scanned for the initial indication that the real-world marker is present in the target region.

19. A computer-readable storage medium storing computer-readable instructions, the computer-readable instructions, when executed by one or more processor devices, causing the one or more processor devices to perform acts comprising:
using at least one image capture device, scanning an environment to identify characteristics that are indicative of the possible presence of a physical marker;
outputting an indication that the environment is being scanned for the possible presence of the physical marker;
after to successfully detecting the presence of the physical marker in the environment, receiving plural instances of image information captured at plural vantage points in the environment by the at least one image capture device;
processing the plural instances of image information to identify plural instances of marker information in the respective instances of image information, the plural instances of marker information identifying the physical marker that is present in the environment;
determining a position of the physical marker in the environment relative to the at least one image capture device based at least on the plural instances of marker information; and
placing a virtual object in a modified-reality world in relation to the position of the physical marker.

20. The computer-readable storage medium of claim 19, the acts further comprising:
outputting the indication that the environment is being scanned for the possible presence of the physical marker in at least one instance when a target region is being scanned and the target region includes no indication that the physical marker is present in the target region.

21. The computer-readable storage medium of claim 20, wherein the indication comprises a search indicator displayed along a border of the target region while the target region is being scanned.

* * * * *